(12) United States Patent
Okada

(10) Patent No.: US 12,344,258 B2
(45) Date of Patent: Jul. 1, 2025

(54) YAW RATE ESTIMATING DEVICE

(71) Applicant: HONDA MOTOR CO., LTD., Tokyo (JP)

(72) Inventor: Shuichi Okada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 751 days.

(21) Appl. No.: 17/666,711

(22) Filed: Feb. 8, 2022

(65) Prior Publication Data

US 2022/0250630 A1 Aug. 11, 2022

(30) Foreign Application Priority Data

Feb. 10, 2021 (JP) ................... 2021-020270

(51) Int. Cl.
*B60W 40/114* (2012.01)
*B60W 30/18* (2012.01)
(Continued)

(52) U.S. Cl.
CPC .... *B60W 40/114* (2013.01); *B60W 30/18145* (2013.01); *B60W 50/00* (2013.01); *G06V 20/588* (2022.01); *B60W 2050/0056* (2013.01); *B60W 2420/403* (2013.01); *B60W 2520/06* (2013.01); *B60W 2520/10* (2013.01); *B60W 2520/14* (2013.01); *B60W 2552/30* (2020.02)

(58) Field of Classification Search
None
See application file for complete search history.

(56) References Cited

U.S. PATENT DOCUMENTS

| 2015/0161895 A1 | 6/2015 | You et al. |
| 2017/0106871 A1 | 4/2017 | You et al. |

(Continued)

FOREIGN PATENT DOCUMENTS

| CN | 104709283 A | 6/2015 |
| CN | 108698605 A | 10/2018 |

(Continued)

OTHER PUBLICATIONS

Chinese Office Action received in corresponding Chinese application No. 202210099795.0 dated Apr. 27, 2025 (11 pages).

*Primary Examiner* — Christian Chace
*Assistant Examiner* — Katherine Marie Fitzharris
(74) *Attorney, Agent, or Firm* — Rankin, Hill & Clark LLP

(57) ABSTRACT

Yaw rate estimating device includes: information acquirer that acquires information on front image and information on vehicle speed; lane recognizer that recognizes traveling lane drawn on traveling route of own vehicle and curvature thereof based on information on front image; direction change rate calculator that calculates change rate of direction of traveling lane based on information on curvature of traveling lane and vehicle speed; yaw angle change rate calculator that calculates change rate of yaw angle of own vehicle with respect to direction of traveling lane based on information on curvature of traveling lane and vehicle speed; and lane yaw rate estimator that estimates lane yaw rate based on change rate of direction of traveling lane and change rate of yaw angle of own vehicle with respect to direction of traveling lane, wherein estimated lane yaw rate is used as yaw rate of own vehicle.

7 Claims, 12 Drawing Sheets

(51) Int. Cl.
  *B60W 50/00*    (2006.01)
  *G06V 20/56*    (2022.01)

(56) References Cited

U.S. PATENT DOCUMENTS

2019/0152523 A1* 5/2019 Hajika ................... B62D 6/005
2019/0375418 A1   12/2019 Shimizu et al.
2022/0105983 A1*  4/2022 Omikawa ............ B62D 15/025
2023/0127230 A1*  4/2023 Molnar ................. B60W 40/12
                                            701/23

FOREIGN PATENT DOCUMENTS

| JP | 2006-199242 A | 8/2006 |
| JP | 2008-232946 A | 10/2008 |
| JP | 2019-131149 A | 8/2019 |

* cited by examiner

YAW RATE ESTIMATING DEVICE

BACKGROUND OF THE INVENTION

1. Field of the Invention

The present invention relates to a yaw rate estimating device for estimating the yaw rate of the own vehicle.

2. Description of the Related Art

Conventionally, a yaw rate estimating device that is mounted on a vehicle to estimate the yaw rate of the own vehicle is known (see Patent Literature 1).

The yaw rate estimating device according to Patent Literature 1 includes a yaw rate sensor that detects the yaw rate of the own vehicle and an image photographing means that captures an image in front of the own vehicle, and determines whether or not the own vehicle is traveling straight based on the image in front of the own vehicle captured by the image photographing means. When it is determined that the own vehicle is traveling straight, the output value of the yaw rate sensor is made to match zero.

According to the yaw rate estimating device according to Patent Literature 1, the zero point calibration of the output value (yaw rate) of the yaw rate sensor can be performed even during traveling.

Patent Literature 1: JP2006-199242A

SUMMARY OF THE INVENTION

However, the yaw rate estimating device according to Patent Literature 1 estimates the target travel line of the own vehicle based on the image in front of the vehicle, and assumes that the own vehicle travels along the estimated target travel line, and estimates the yaw rate of the own vehicle based on the yaw angle and the traveling speed at a certain point in the future based on that assumption (after a predetermined time has elapsed from the present time) (see paragraph [0022] to [0025] of Patent Literature 1).

Therefore, the yaw rate estimating device according to Patent Literature 1 can estimate the yaw rate at a certain point in the future, but cannot estimate the yaw rate at the present time. Further, in the case where the assumption that the own vehicle will be traveling along the estimated target travel line is broken, it is impossible to estimate with high precision the yaw rate that embodies the yaw direction behavior of the own vehicle (hereinafter referred to as "yaw behavior") that fluctuates from moment to moment.

The present invention has been made to solve the above problems, and an object thereof is to provide a yaw rate estimating device that can estimate with high precision the yaw rate that embodies the yaw behavior of the own vehicle that fluctuates from moment to moment.

To achieve the above-described object, a principal feature of the present invention according a first aspect is a yaw rate estimating device including: an information acquirer that acquires information on a front image of an own vehicle and information on a vehicle speed; a lane recognizer that recognizes a traveling lane drawn on a traveling route of the own vehicle and a curvature of the traveling lane based on the information on the acquired front image of the own vehicle; a direction change rate calculator that calculates a change rate of a direction of the traveling lane on reference coordinates for the own vehicle based on the information on the recognized curvature of the traveling lane and the acquired vehicle speed; a yaw angle change rate calculator that calculates a change rate of a yaw angle of the own vehicle with respect to the direction of the traveling lane on the reference coordinates for the own vehicle based on the information on the recognized curvature of the traveling lane and the acquired vehicle speed; and a lane yaw rate estimator that estimates a lane yaw rate, which is a yaw rate derived from the information on the curvature of the traveling lane and the vehicle speed of the own vehicle, based on the change rate of the direction of the traveling lane calculated by the direction change rate calculator and the change rate of the yaw angle of the own vehicle with respect to the direction of the traveling lane calculated by the yaw angle change rate calculator, in which the estimated lane yaw rate is used as the yaw rate of the own vehicle.

The invention according to the first aspect estimates the lane yaw rate based on the information on the curvature of the traveling lane drawn on the traveling route of the own vehicle and the vehicle speed of the own vehicle, and uses the estimated lane yaw rate as the yaw rate of the own vehicle, and thus can estimate with high precision the yaw rate that expresses the yaw behavior of the own vehicle that fluctuates from moment to moment.

According to the present invention, it is possible to estimate with high precision the yaw rate that expresses the yaw behavior of the own vehicle that fluctuates from moment to moment.

DETAILED DESCRIPTION OF THE EMBODIMENTS

Figure 1:
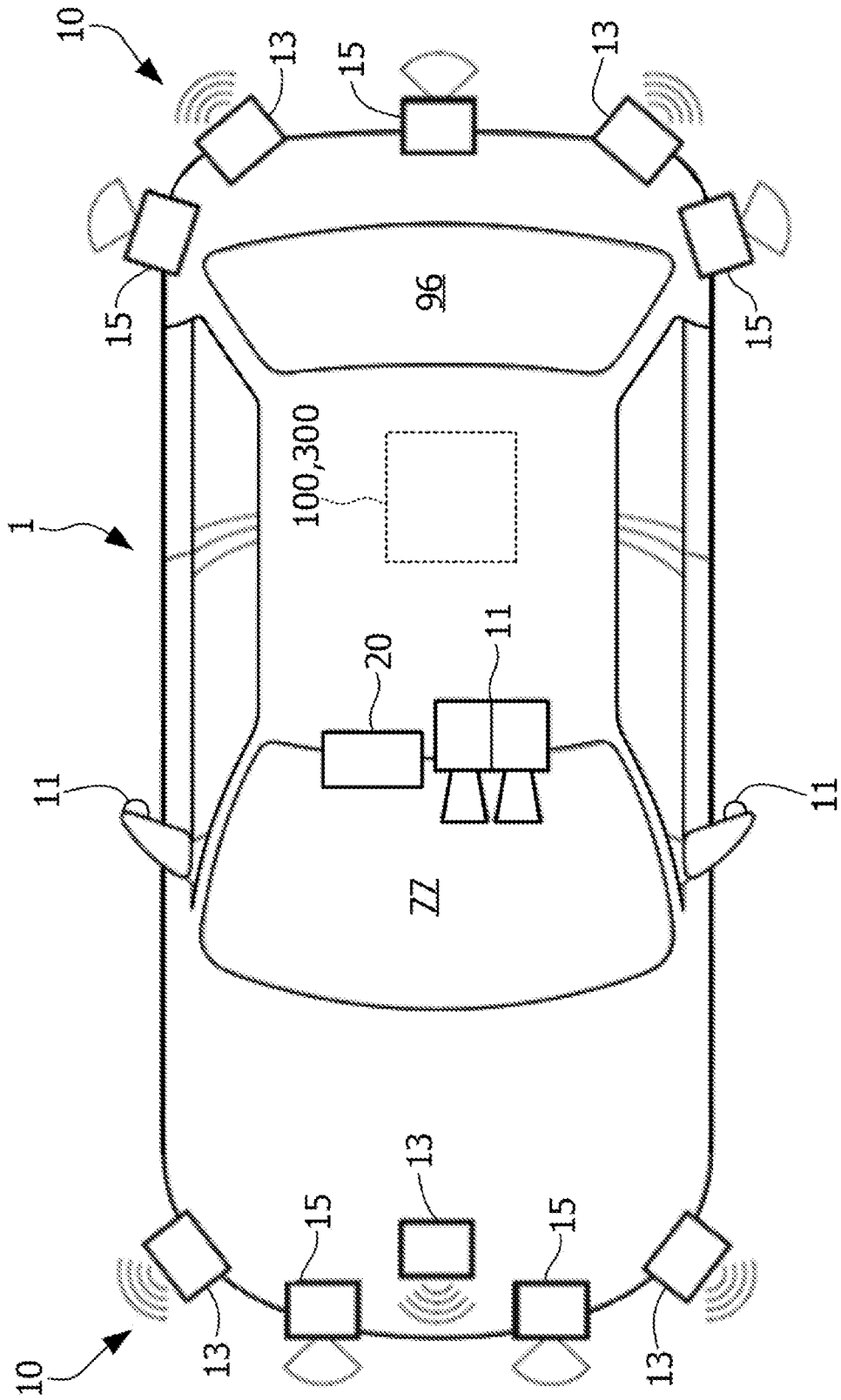
FIG. 1 is an overall configuration diagram of an autonomous vehicle including a vehicle control device provided with a yaw rate estimating device according to the present invention.

Hereinafter, the yaw rate estimating device according to the embodiment of the present invention will be described in detail with reference to the drawings.

Note that in the drawings shown below, members having a common function shall be designated by a common reference numeral. Further, the size and shape of a member may be deformed or exaggerated schematically for convenience of explanation.

In the description of an autonomous vehicle (hereinafter may be referred to as "own vehicle" or "vehicle") 1 including a vehicle control device 100 provided with a yaw rate estimating device 300 according to the present invention, when the left and right expressions are used as to the own vehicle 1, the front in the traveling direction of the own vehicle 1 is used as a reference. Specifically, for example, in the case where the own vehicle 1 has a right steering wheel specification, the driver's seat side is referred to as the right side and the passenger seat side is referred to as the left side.

[Configuration of Autonomous Vehicle (Own Vehicle) 1]
First, the configuration of the autonomous vehicle (own vehicle) 1 including the vehicle control device 100 provided with the yaw rate estimating device 300 according to the present invention will be described with reference to FIG. 1.

FIG. 1 is an overall configuration diagram of an autonomous vehicle (own vehicle) 1 including a vehicle control device 100 provided with a yaw rate estimating device 300 according to the present invention.

As shown in FIG. 1, the own vehicle 1 on which the vehicle control device 100 provided with the yaw rate estimating device 300 according to the present invention is mounted is, for example, a two-wheeled vehicle, a three-wheeled vehicle, a four-wheeled vehicle, or the like.

The own vehicle 1 includes a vehicle powered by an internal combustion engine such as a diesel engine or a gasoline engine, an electric vehicle powered by an electric motor, a hybrid vehicle having an internal combustion engine and an electric motor, and the like. Of these, the electric vehicle is driven by using the electric power discharged by a battery such as a secondary battery, a hydrogen fuel cell, a metal fuel cell, or an alcohol fuel cell.

As shown in FIG. 1, the own vehicle 1 is mounted with an external environment sensor 10 having a function of detecting external environment information on a target including an object or a sign present around the own vehicle 1, a navigation device 20 having a function of mapping the current position of the own vehicle 1 on a map and providing route guidance to a destination, and a vehicle control device 100 having a function of autonomous driving control and the like of the own vehicle 1 including steering, acceleration, and deceleration of the own vehicle 1.

These devices and instruments are configured to connect to each other so as to be capable of data communication via a communication medium such as controller area network (CAN).

[External Environment Sensor 10]
The external environment sensor 10 includes a camera 11, a radar 13, and a lidar 15.

The camera 11 has an optical axis inclined diagonally downward in front of the own vehicle, and has a function of capturing an image of the traveling direction of the own vehicle 1. As the camera 11, for example, a complementary metal oxide semiconductor (CMOS) camera, a charge coupled device (CCD) camera, or the like can be appropriately used. The camera 11 is provided in the vicinity of the rear-view mirror (not shown) in the passenger compartment of the own vehicle 1, and on the right door at front portion, the left door at front portion, and the like outside the passenger compartment of the own vehicle 1.

For example, the camera 11 periodically and repeatedly captures the surroundings of the own vehicle 1, that is, the state of front in the traveling direction, the left-right side, and the rear in the traveling direction. In the present embodiment, the camera 11 provided in the vicinity of the rear-view mirror includes a pair of monocular cameras arranged side by side. The camera 11 may be a stereo camera.

The image information of the own vehicle 1 captured by the camera 11 in front in the traveling direction, the left-right side, and the rear in the traveling direction is transmitted to the vehicle control device 100 via the communication medium.

The radar 13 has a function of irradiating a target including a preceding vehicle to be followed traveling in front of the own vehicle 1 with a radar wave, and also receiving the radar wave reflected by the target to acquire the distribution information on the target including the distance to the target and the direction of the target. As the radar wave, a laser, a microwave, a millimeter wave, an ultrasonic wave or the like can be appropriately used.

In the present embodiment, as shown in FIG. 1, five radars 13 are provided in total since there are three on the front side and two on the rear side. The distribution information on the target by the radar 13 is transmitted to the vehicle control device 100 via the communication medium.

The lidar 15 (LIDAR: light detection and ranging) has a function of detecting the presence or absence of a target and the distance to the target by measuring the time required for detecting the scattered light with respect to the irradiation light, for example. In this embodiment, as shown in FIG. 1, two lidars 15 are provided on the front side and three lidars 15 are provided on the rear side. The distribution information on the target by the lidar 15 is transmitted to the vehicle control device 100 via the communication medium.

[Navigation Device 20]
The navigation device 20 includes a global navigation satellite system (GNSS) receiver, map information (navigation map), a touch panel type internal display device 61 that functions as a human-machine interface, a speaker 63 (for all of which see FIG. 3), a microphone, and the like. The navigation device 20 plays a role of determining the current position of the own vehicle 1 by the GNSS receiver and deriving a route from the current position to the destination designated by the user.

The route derived by the navigation device 20 is provided to the target traveling lane determinator 110 (described later) of the vehicle control device 100. The current position of the own vehicle 1 may be specified or complemented by an inertial navigation system (INS) using the output of the vehicle sensor 30 (see FIG. 2). Further, the navigation device 20 provides guidance by voice or map display on the route to the destination when the vehicle control device 100 is executing the manual drive mode.

Note that the function for determining the current position of the own vehicle 1 may be provided independently of the navigation device 20. Further, the navigation device 20 may be achieved by the function of a terminal device such as a smartphone or a tablet terminal carried by the user, for example. In this case, information is transmitted and received between the terminal device and the vehicle control device 100 by wireless or wired communication.

[Vehicle Control Device 100 Provided with the Yaw Rate Estimating Device 300 and Peripheral Portion Configuration Thereof]

Next, a vehicle control device 100 provided with the yaw rate estimating device 300 according to the embodiment of the present invention mounted on the own vehicle 1 and a peripheral portion configuration thereof will be described with reference to FIG. 2.

Figure 2:
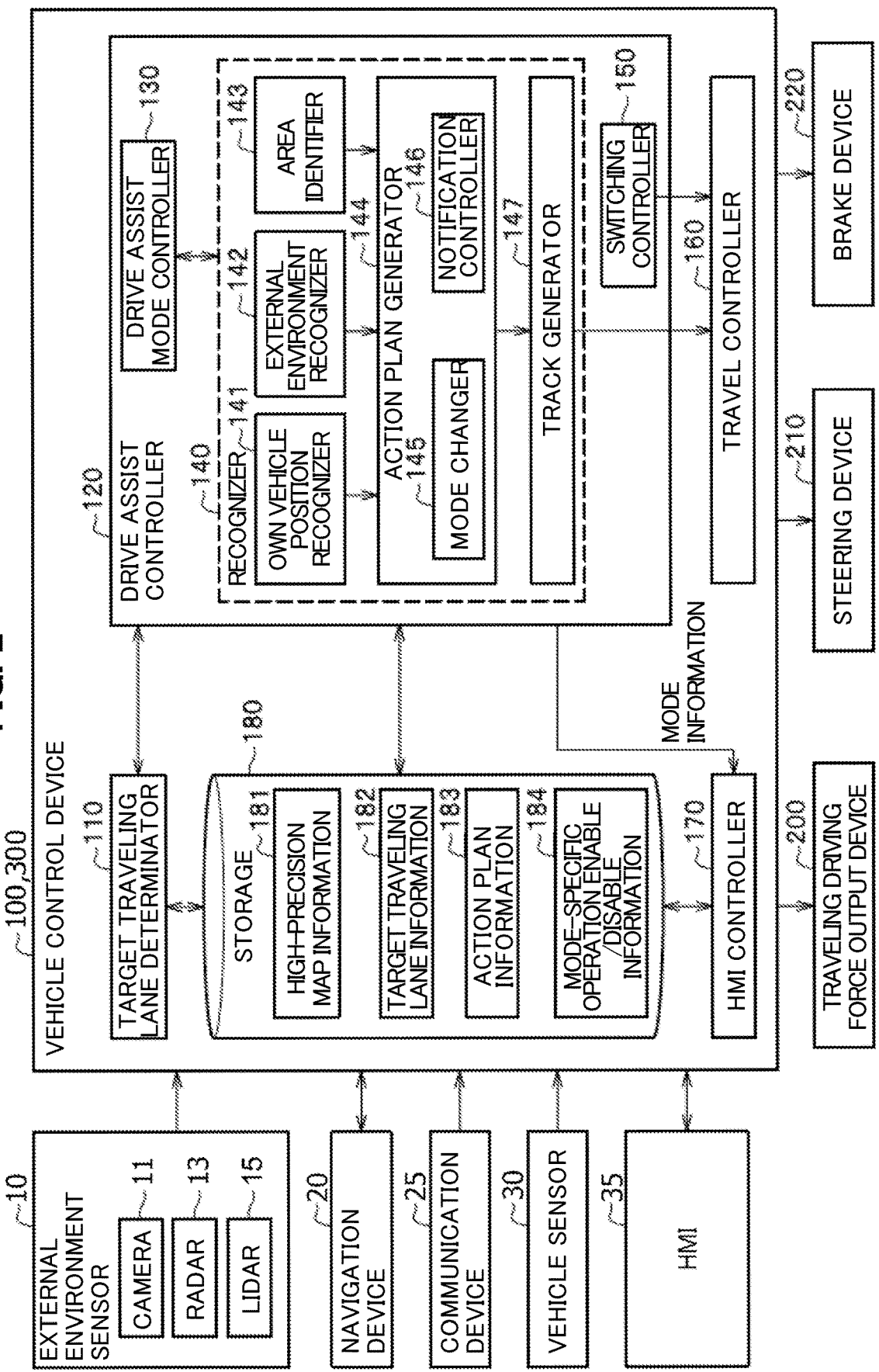
FIG. 2 is a functional block configuration diagram showing a configuration of a vehicle control device provided with a yaw rate estimating device according to the present invention and peripheral portions thereof.

FIG. 2 is a functional block configuration diagram showing the configuration of the vehicle control device 100 provided with the yaw rate estimating device 300 according to the embodiment of the present invention and peripheral portions thereof.

The own vehicle 1 is mounted with the external environment sensor 10, the navigation device 20, and the vehicle control device 100 described above, as well as a communication device 25, a vehicle sensor 30, a human machine interface (HMI) 35, a traveling driving force output device 200, a steering device 210, and a brake device 220, as shown in FIG. 2.

The communication device 25, the vehicle sensor 30, the HMI 35, the traveling driving force output device 200, the steering device 210, and the brake device 220 are configured to connect to the vehicle control device 100 to enable mutual data communication via a communication medium.

[Communication Device 25]

The communication device 25 has a function of communicating via a wireless communication medium such as a cellular network, a Wi-Fi network, Bluetooth (registered trademark), or dedicated short range communication (DSRC).

For example, the communication device 25 wirelessly communicates with an information providing server of a system for monitoring road traffic conditions such as vehicle information and communication system (VICS: here, VICS is a registered trademark), and acquires traffic information indicating the traffic conditions of the road on which the own vehicle 1 is traveling or the road to be traveled. The traffic information includes information on traffic congestion ahead, time required to pass through congested points, accidents, broken down vehicles, construction work, speed restrictions, traveling lane restrictions, location of parking lots, and information on full or empty parking lots, service areas, and parking areas.

The communication device 25 may acquire the traffic information by communication with a wireless beacon installed on the side of the road or the like, or by vehicle-to-vehicle communication with other vehicles traveling around the own vehicle 1.

Further, the communication device 25 performs wireless communication with, for example, the information providing server of a traffic signal prediction system (TSPS), and acquires signal information on the traffic lights provided on the road on which the own vehicle 1 is traveling or is scheduled to travel. The TSPS plays a role of supporting the operation for smoothly passing through the signalized intersection by using the signal information on the traffic light.

The communication device 25 may acquire the signal information by communication with an optical beacon installed on the side of the road or the like, or by vehicle-to-vehicle communication with other vehicles traveling around the own vehicle 1.

[Vehicle Sensor 30]

The vehicle sensor 30 has a function of detecting various information sets on the own vehicle 1. The vehicle sensor 30 includes a vehicle speed sensor that detects the vehicle speed of the own vehicle 1, an acceleration sensor that detects the acceleration of the own vehicle 1, a yaw rate sensor that detects the angular velocity around the vertical axis of the own vehicle 1, an orientation sensor that detects the direction of the own vehicle 1, an inclination angle sensor that detects the inclination angle of the own vehicle 1, an illuminance sensor that detects the illuminance of the place where the own vehicle 1 is located, a raindrop sensor that detects the amount of raindrop in the place where the own vehicle 1 is located, and the like.

[Configuration of HMI 35]

Next, the HMI 35 will be described with reference to FIGS. 3 and 4.

Figure 3:
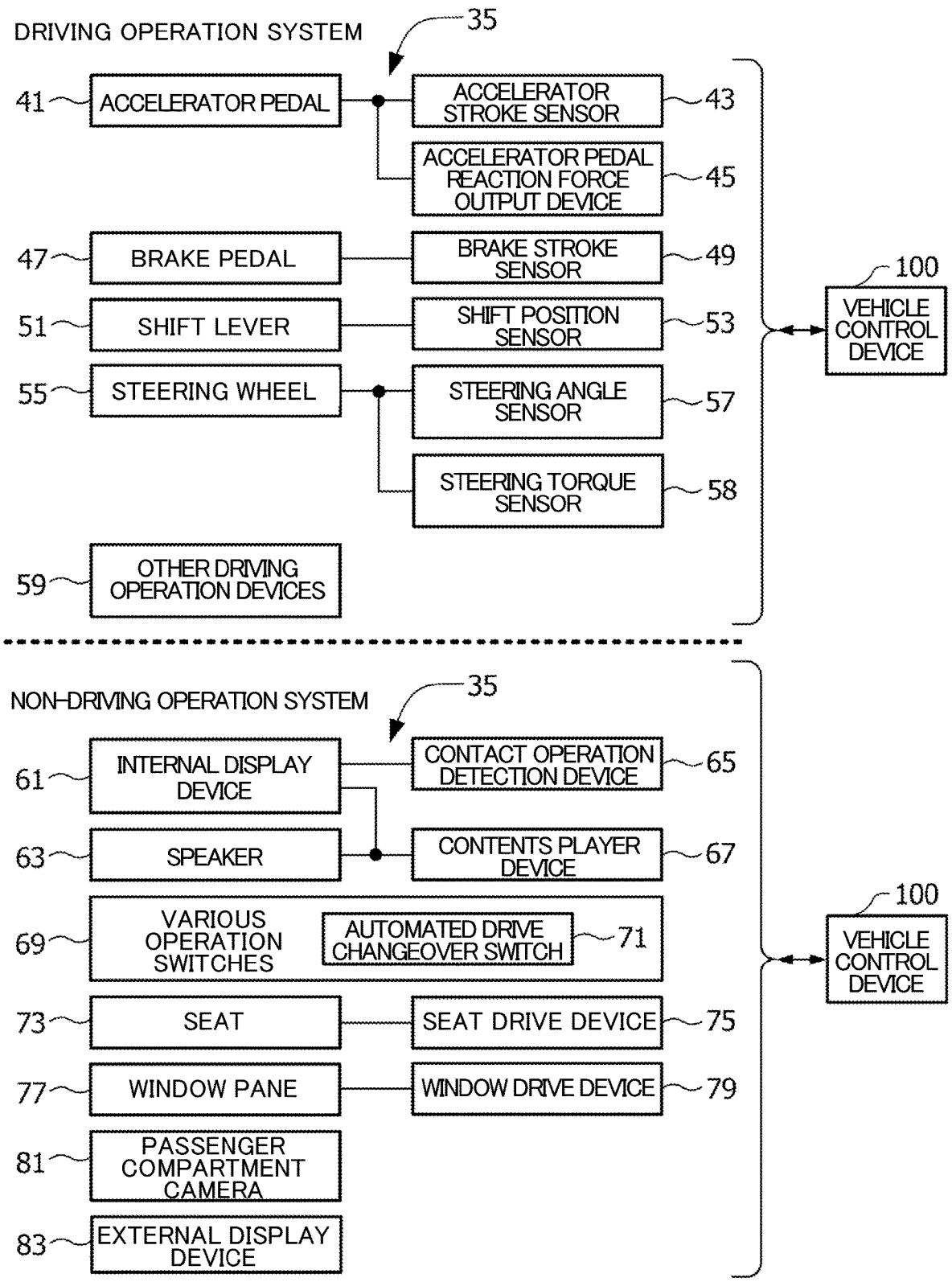
FIG. 3 is a schematic configuration diagram of an HMI provided in a vehicle control device.
Figure 4:
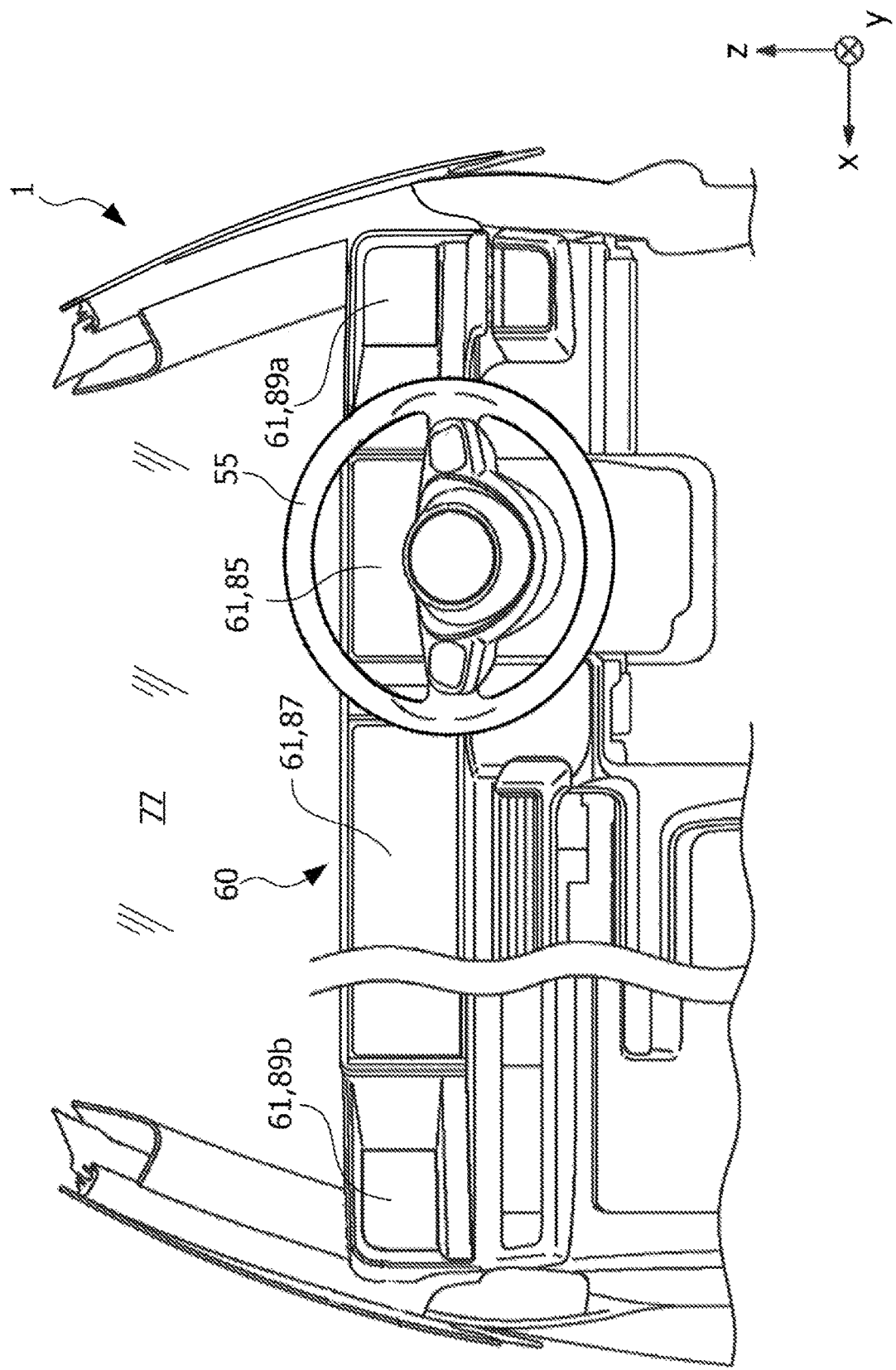
FIG. 4 is a diagram showing a front structure of a passenger compartment of an autonomous vehicle.

FIG. 3 is a schematic configuration diagram of an HMI 35 connected to the vehicle control device 100 according to the embodiment of the present invention. FIG. 4 is a diagram showing a front structure of a passenger compartment of the vehicle 1 including the vehicle control device 100.

As shown in FIG. 3, the HMI 35 includes a constituent member of a driving operation system and a constituent member of a non-driving operation system. The boundaries between them are not clear, and one may employ a configuration in which the constituent members of the driving operation system have the functions of the non-driving operation system (or vice versa).

As shown in FIG. 3, as constituent members of the driving operation system, the HMI 35 includes an accelerator pedal 41, an accelerator stroke sensor 43, an accelerator pedal reaction force output device 45, a brake pedal 47, a brake stroke sensor 49, a shift lever 51, a shift position sensor 53, a steering wheel 55, a steering angle sensor 57, a steering torque sensor 58, and other driving operation devices 59.

The accelerator pedal 41 is an acceleration controller for receiving an acceleration instruction (or a deceleration instruction by a return operation) by the driver. The accelerator stroke sensor 43 detects the stepping stroke of the accelerator pedal 41, and outputs an accelerator stroke signal indicating the stepping stroke to the vehicle control device 100.

Note that instead of outputting an accelerator stroke signal to the vehicle control device 100, one may employ a configuration in which it is directly outputted to the traveling driving force output device 200, the steering device 210, or the brake device 220. The same applies to the configurations of other driving operation systems described below. The accelerator pedal reaction force output device 45 outputs a force (operation reaction force) in the direction opposite to the operation direction to the accelerator pedal 41, for example, in response to an instruction from the vehicle control device 100.

The brake pedal 47 is a deceleration controller for receiving a deceleration instruction by the driver. The brake stroke sensor 49 detects the stepping stroke (or stepping force) of the brake pedal 47, and outputs a brake signal indicating the detection result to the vehicle control device 100.

The shift lever 51 is a transmission controller for receiving an instruction to change the shift stage by the driver. The shift position sensor 53 detects the shift stage instructed by the driver, and outputs a shift position signal indicating the detection result to the vehicle control device 100.

The steering wheel 55 is a steering controller for receiving a turning instruction by the driver. The steering angle sensor 57 detects the operating angle of the steering wheel 55, and outputs a steering angle signal indicating the detection result to the vehicle control device 100. The steering torque sensor 58 detects the torque applied to the steering wheel 55, and outputs a steering torque signal indicating the detection result to the vehicle control device 100.

Examples of the other driving operation devices 59 include a joystick, a button, a dial switch, a graphical user interface (GUI) switch, and the like. The other driving operation devices 59 receive an acceleration instruction, a deceleration instruction, a turning instruction, and the like, and output the instructions to the vehicle control device 100.

As shown in FIG. 3, as constituent members of the non-driving operation system, the HMI 35 includes an internal display device 61, a speaker 63, a contact operation detection device 65, a contents player device 67, various operation switches 69, a seat 73, a seat drive device 75, a window pane 77, a window drive device 79, a passenger compartment camera 81, and an external display device 83, for example.

The internal display device 61 is preferably a touch panel type display device having a function of displaying various information sets to the occupants in the passenger compartment. As shown in FIG. 4, in the instrument panel 60, the internal display device 61 includes a meter panel 85 provided at a position facing the driver's seat, a horizontally long multi-information panel 87 in the vehicle width direction (Y-axis direction in FIG. 4) provided across the driver's seat side and the passenger seat side, a right side panel 89a provided on the driver's seat side in the vehicle width direction, and a left side panel 89b provided on the passenger seat side in the vehicle width direction. Note that the internal display device 61 may be additionally provided at a position facing the rear seats (on the back side of the front seats).

The meter panel 85 displays, for example, a speedometer, a tachometer, an odometer, shift position information, lighting status information on lights, and the like.

The multi-information panel 87 displays, for example, various information sets such as map information around the own vehicle 1, current position information on the own vehicle 1 on the map, traffic information on the current traveling route/planned route of the own vehicle 1 (including signal information), traffic participant information on traffic participants (including pedestrians, bicycles, motorcycles, other vehicles, and the like) around the own vehicle 1, and messages sent to the traffic participants.

The right side panel 89a displays image information on the rear and lower sides of the own vehicle 1 on the right side, captured by the camera 11 provided on the right side of the own vehicle 1.

The left side panel 89b displays image information on the rear and lower sides of the own vehicle 1 on the left side, captured by the camera 11 provided on the left side of the own vehicle 1.

The internal display device 61 is not particularly limited, but is composed of, for example, a liquid crystal display (LCD), an organic electroluminescence (EL), or the like. The internal display device 61 may be composed of a head up display (HUD) that projects a required image onto the window pane 77.

The speaker 63 has a function of outputting sound. An appropriate number of speakers 63 are provided at appropriate positions such as an instrument panel 60, a door panel, and a rear parcel shelf (none of which is shown) in the passenger compartment.

When the internal display device 61 is a touch panel type, the contact operation detection device 65 has a function of detecting a touch position on the display screen of the internal display device 61 and outputting the detected touch position information to the vehicle control device 100. Note that when the internal display device 61 is not a touch panel type, the contact operation detection device 65 can omit this.

The contents player device 67 includes, for example, a digital versatile disc (DVD) player device, a compact disc (CD) player device, a television receiver, a generation device for various guide images, and the like. The internal display device 61, the speaker 63, the contact operation detection device 65, and the contents player device 67 may be partially or wholly configured in common with the navigation device 20.

The various operation switches 69 are arranged at appropriate positions in the passenger compartment. The various operation switches 69 include an automated drive changeover switch 71 for instructing immediate start (or future start) and stop of automated drive. The automated drive changeover switch 71 may be either a graphical user interface (GUI) switch or a mechanical switch. Further, the various operation switches 69 may include a switch for driving the seat drive device 75 and the window drive device 79.

The seat 73 is a seat on which an occupant of the own vehicle 1 sits. The seat drive device 75 drives the seat 73 so that the reclining angle, the position in the front-rear direction, the yaw angle, and the like can be freely changed. The window pane 77 is provided on each door, for example. The window drive device 79 drives the window pane 77 to open and close.

The passenger compartment camera 81 is a digital camera that uses a solid-state image sensor such as a CCD or CMOS. The passenger compartment camera 81 is provided at a position that can at least capture the head of the occupant (driver) seated in the driver's seat and the passenger seat occupant, such as the rear-view mirror, the steering boss (both of which not shown), and the instrument panel 60. The passenger compartment camera 81 periodically and repeatedly captures the state of the passenger compartment including the driver and the occupant in the passenger seat, for example.

The external display device 83 has a function of displaying various information sets to traffic participants (including pedestrians, bicycles, motorcycles, other vehicles, and the like) present around the own vehicle 1. On the front grille of the own vehicle 1, the external display device 83 includes a right front illuminator and a left front illuminator provided apart from each other in the vehicle width direction, and a front displayer provided between the left and right front illuminators (none of which is shown).

[Configuration of Vehicle Control Device 100]

Next, returning to FIG. 2, the configuration of the vehicle control device 100 will be described.

The vehicle control device 100 is achieved by, for example, one or more processors or hardware having equivalent functions. The vehicle control device 100 may have a configuration that is a combination of a processor such as a central processing unit (CPU), a storage device, an electronic control unit (ECU) connected with a communication interface by an internal bus, a micro-processing unit (MPU), and the like.

The vehicle control device 100 includes a target traveling lane determinator 110, a drive assist controller 120, a travel controller 160, an HMI controller 170, and a storage 180. The functions of the target traveling lane determinator 110 and the drive assist controller 120, and a part or all of the functions of the travel controller 160 are achieved by the processor executing a program (software). Further, some or all of these functions may be achieved by hardware such as large scale integration (LSI) or application specific integrated circuit (ASIC), or may be achieved by a combination of software and hardware.

In the following explanations, when a subject is described as the "○○ part," it is assumed that the drive assist controller 120 reads each program from a ROM or electrically erasable programmable read-only memory (EEPROM) as necessary, loads it onto a RAM, and executes the functions pertaining to the "○○ part." Each program may be stored in the storage 180 in advance, or may be incorporated into the vehicle control device 100 as necessary via another storage medium or communication medium.

[Target Traveling Lane Determinator 110]

The target traveling lane determinator 110 is achieved by, for example, a micro processing unit (MPU). The target traveling lane determinator 110 divides the route provided by the navigation device 20 into multiple blocks (for example, divides into 100 [m] sections with respect to the vehicle traveling direction), and refers to the high-precision map information 181 to determine a target traveling lane for each block. The target traveling lane determinator 110 determines, for example, which traveling lane from the left to travel.

For example, when the target traveling lane determinator 110 has a branching point or a merging point on the route, the target traveling lane determinator 110 determines the target traveling lane so that the own vehicle 1 can travel on a rational traveling route for traveling beyond the branch. The target traveling lane determined by the target traveling lane determinator 110 is stored in the storage 180 as the target traveling lane information 182.

[Drive Assist Controller 120]

The drive assist controller 120 includes a drive assist mode controller 130, a recognizer 140, and a switching controller 150.

<Drive Assist Mode Controller 130>

The drive assist mode controller 130 determines the automated drive mode (automated drive assist state) executed by the drive assist controller 120 based on the driver's operation on the HMI 35, the event determined by the action plan generator 144, the driving condition determined by the track generator 147, and the like. The automated drive mode is notified to the HMI controller 170.

In any of the automated drive modes, it is possible to switch (override) to a lower automated drive mode by operating the constituent components of the driving operation system in the HMI 35.

Override is started when the driver of the own vehicle 1 continues to operate the constituent components of the driving operation system of the HMI 35 for longer than a predetermined time, when a predetermined operation change amount (for example, the accelerator stroke by the accelerator pedal 41, the brake stroke by the brake pedal 47, and the steering angle by the steering wheel 55) is exceeded, or when an operation on the constituent components of the driving operation system is performed more than a predetermined number of times, for example.

<Recognizer 140>

The recognizer 140 includes an own vehicle position recognizer 141, an external environment recognizer 142, an area identifier 143, an action plan generator 144, and a track generator 147.

<Own Vehicle Position Recognizer 141>

The own vehicle position recognizer 141 recognizes the traveling lane 93 (see FIG. 6) drawn on the traveling route 91 of the own vehicle 1 (see FIG. 6) and the relative position (relative coordinates: details will be described later) of the own vehicle 1 with respect to the traveling lane 93 based on the high-precision map information 181 stored in the storage 180 and the information inputted from the camera 11, the radar 13, the lidar 15, the navigation device 20, or the vehicle sensor 30.

The own vehicle position recognizer 141 recognizes the traveling lane by, for example, comparing the pattern of road lane marks recognized on the high-precision map information 181 (for example, the arrangement of solid lines and broken lines) with the pattern of road lane marks around the own vehicle 1 recognized on the image captured by the camera 11. In this recognition, the current position of the own vehicle 1 acquired from the navigation device 20 and the processing results by the INS may be appropriately added.

<External Environment Recognizer 142>

As shown in FIG. 2, the external environment recognizer 142 recognizes, for example, an external environment state including the position, vehicle speed, and acceleration of nearby vehicles based on the external environment information inputted from the external environment sensor 10 including the camera 11, the radar 13, and the lidar 15. A nearby vehicle is, for example, a vehicle traveling near the own vehicle 1 and another vehicle (a front-running vehicle, a parallel-running vehicle, and a rear-running vehicle) traveling in the same direction as the own vehicle 1.

The position of a nearby vehicle may be represented by a representative point such as the center of gravity or a corner of the other vehicle, or may be represented by a region represented by the outline of the other vehicle. The state of a nearby vehicle may include the speed and acceleration of the nearby vehicle and whether or not it is changing traveling lanes (or whether or not it is trying to change traveling lanes), which is grasped based on the information of the above-mentioned various devices. Further, the external environment recognizer 142 may employ a configuration that recognizes the position of a target including a guard rail, a utility pole, a parked vehicle, a pedestrian, and a traffic sign in addition to nearby vehicles including front-running vehicles and rear-running vehicles.

<Area Identifier 143>

The area identifier 143 acquires information on a specific area (interchange: IC/junction: JCT/point of increasing or decreasing traveling lanes) present around the own vehicle 1 based on the map information. As a result, the area identifier 143 can acquire information on a specific area that assists the smooth progress of the own vehicle 1 even when it is impossible to acquire an image of the traveling direction with the external environment sensor 10 due to the presence of a vehicle in front, including front-running vehicles.

Note that the area identifier 143 may acquire information on a specific area by, instead of acquiring information on the specific area based on map information, identifying the target by image processing based on the image of the traveling direction acquired with the external environment sensor 10, or recognizing the target based on the outline of the image of the traveling direction by internal processing of the external environment recognizer 142.

Further, as described later, one may employ a configuration in which the VICS information obtained by the communication device 25 is used to improve the precision of the information on the specific area acquired by the area identifier 143.

<Action Plan Generator 144>

The action plan generator 144 sets the start point of automated drive and/or the destination of automated drive. The start point of automated drive may be the current position of the own vehicle 1 or a point where the operation for instructing automated drive is performed. The action plan generator 144 generates an action plan in a section between the start point and the destination of automated drive. Not limited to this, the action plan generator 144 may generate an action plan for any section.

An action plan is composed of, for example, multiple events to be executed sequentially. Examples of the multiple events include a deceleration event for decelerating the own vehicle 1, an acceleration event for accelerating the own vehicle 1, a traveling lane keep event for driving the own vehicle 1 so as not to deviate from the traveling lane, a traveling lane change event that changes traveling lanes, an overtake event that causes the own vehicle 1 to overtake the front-running vehicle, a branching event in which the vehicle 1 is changed to a desired traveling lane at a branching point or the own vehicle 1 is driven so as not to deviate from the current traveling lane, a merging event in which the own vehicle 1 is accelerated or decelerated in the merging traveling lane for merging into the main lane to change traveling lanes, and a handover event that shifts from the manual drive mode to the automated drive mode (automated drive assist state) at the start point of automated drive, or shifts from the automated drive mode to the manual drive mode at the scheduled end point of the automated drive.

The action plan generator 144 sets a traveling lane change event, a branching event, or a merging event at a position for switching the target traveling lane determined by the target traveling lane determinator 110. The information indicating the action plan generated by the action plan generator 144 is stored in the storage 180 as the action plan information 183.

The action plan generator 144 includes a mode changer 145 and a notification controller 146.

<Mode Changer 145>

For example, based on the recognition results on the target present in the traveling direction of the own vehicle 1 by the external environment recognizer 142, the mode changer 145 selects a drive mode suitable for the above recognition results from the drive modes including multiple steps of preset automated drive mode and manual drive mode, and uses the selected drive mode to cause the own vehicle 1 to perform drive operation.

<Notification Controller 146>

When the drive mode of the own vehicle 1 is shifted by the mode changer 145, the notification controller 146 notifies that the drive mode of the own vehicle 1 has shifted. The notification controller 146 notifies that the drive mode of the own vehicle 1 has shifted by outputting the sound information stored in advance in the storage 180 to the speaker 63, for example.

Note that as long as it is possible to notify the driver of the shift of driving modes of the own vehicle 1, the notification may be performed not only by sound but also by display, light emission, vibration, or a combination thereof <Track Generator 147>

The track generator 147 generates a track to be traveled by the own vehicle 1 based on the action plan generated by the action plan generator 144.

<Switching Controller 150>

As shown in FIG. 2, the switching controller 150 switches between the automated drive mode and the manual drive mode based on the signal inputted from the automated drive changeover switch 71 (see FIG. 3) and others. Further, the switching controller 150 switches the automated drive mode at that time to a lower drive mode based on the operation of instructing acceleration, deceleration, or steering of the constituent components of the driving operation system in the HMI 35. For example, if the operation amount indicated by the signal inputted from the constituent components of the driving operation system in the HMI 35 is exceeding a threshold for a reference time or longer, the switching controller 150 switches the automated drive mode at that time to a lower drive mode (override).

Further, if no operation on the constituent components of the driving operation system in the HMI 35 is detected for a predetermined time after switching to a lower drive mode by the override, the switching controller 150 may perform switching control to return to the original automated drive mode.

<Travel Controller 160>

The travel controller 160 controls the travel of the own vehicle 1 by controlling the traveling driving force output device 200, the steering device 210, and the brake device 220 so that the own vehicle 1 passes the track to be traveled by the own vehicle 1 generated by the track generator 147 at a scheduled time.

<HMI Controller 170>

When notified of the setting information on the automated drive mode of the own vehicle 1 by the drive assist controller 120, the HMI controller 170 controls the HMI 35 according to the settings of the automated drive mode with reference to the mode-specific operation enable/disable information 184.

As shown in FIG. 2, the HMI controller 170 discriminates between a device that is allowed for use (a part or all of the navigation device 20 and the HMI 35) and a device that is not allowed for use based on the information on the drive mode of the own vehicle 1 acquired from the drive assist controller 120 and by referring to the mode-specific operation enable/disable information 184. Further, the HMI controller 170 controls whether or not the driver's operation regarding the HMI 35 or the navigation device 20 of the driving operation system can be accepted based on the discrimination result.

For example, when the drive mode executed by the vehicle control device 100 is the manual drive mode, the HMI controller 170 accepts driver's operation regarding the HMI 35 of the driving operation system (such as the accelerator pedal 41, the brake pedal 47, the shift lever 51, or the steering wheel 55; see FIG. 3).

The HMI controller 170 includes a display controller 171.

<Display Controller 171>

The display controller 171 controls the display of the internal display device 61 and the external display device 83. Specifically, for example, when the drive mode executed by the vehicle control device 100 is an automated drive mode with a high degree of automation, the display controller 171 controls the internal display device 61 and/or the external display device 83 to display information such as alerts, warnings, and driving assistance to traffic participants present around the own vehicle 1.

Further, the display controller 171 controls the multi-information panel (displayer) 87 of the internal display device 61 to display digital contents including content relating to chat communication and key content extracted based on conversation content relating to the chat communication. This will be described in detail later.

<Storage 180>

The storage 180 stores, for example, information such as high-precision map information 181, target traveling lane information 182, action plan information 183, and mode-specific operation enable/disable information 184. The storage 180 is achieved by a read only memory (ROM), a random access memory (RAM), a hard disk drive (HDD), a flash memory, or the like. The program executed by the processor may be stored in the storage 180 in advance, or may be downloaded from an external device via in-vehicle Internet equipment or the like. Further, the program may be installed in the storage 180 by mounting a portable storage medium storing that program on a not-shown drive device.

The high-precision map information 181 is highly precise map information as compared with the map information normally provided in the navigation device 20. The high-precision map information 181 includes, for example, information on the center of the traveling lane, information on the boundaries of the traveling lane, and the like. The boundaries of the traveling lane include the type, color, length, road width, road shoulder width, main line width, traveling lane width, boundary positions, boundary type (guardrail, planting, curb), zebra zone, and the like of traveling lane marks, and these boundaries are included in the high-precision map.

Further, the high-precision map information 181 may include road information, traffic regulation information, address information (address and zip code), facility information, telephone number information, and the like. The road information includes information indicating the type of road such as an expressway, a toll road, a national highway, and a prefectural road, as well as information such as number of traveling lane on the road, width of each traveling lane, slope of the road, position of the road (three-dimensional coordinates including longitude, latitude, and height), the curve curvature of the traveling lane, the positions of the merging and branching points of traveling lanes, and the signs provided on the road. The traffic regulation information includes information that a traveling lane is blocked due to construction, a traffic accident, traffic congestion, or the like.

[Traveling Driving Force Output Device 200, Steering Device 210, and Brake Device 220]

As shown in FIG. 2, the vehicle control device 100 controls the drive of the traveling driving force output device 200, the steering device 210, and the brake device 220 according to the travel control command by the travel controller 160.

<Traveling Driving Force Output Device 200>

The traveling driving force output device 200 outputs a driving force (torque) for allowing the own vehicle 1 to travel to the driving wheels. For example, when the own vehicle 1 is an automobile powered by an internal combustion engine, the traveling driving force output device 200 includes an internal combustion engine, a transmission, and an engine electronic control unit (ECU: none of which is shown) that controls the internal combustion engine.

Further, when the own vehicle 1 is an electric vehicle powered by an electric motor, the traveling driving force output device 200 includes a traveling motor and a motor ECU (both of which not shown) that controls the traveling motor.

Further, when the own vehicle 1 is a hybrid vehicle, the traveling driving force output device 200 includes an internal combustion engine, a transmission, an engine ECU, a traveling motor, and a motor ECU (none of which is shown).

When the traveling driving force output device 200 includes only an internal combustion engine, the engine ECU adjusts the throttle opening, the shift stage, and the like of the internal combustion engine according to the information inputted from the travel controller 160 described later.

When the traveling driving force output device 200 includes only a traveling motor, the motor ECU adjusts the duty ratio of PWM signals given to the traveling motor according to the information inputted from the travel controller 160.

When the traveling driving force output device 200 includes an internal combustion engine and a traveling motor, the engine ECU and the motor ECU cooperate with each other to control the traveling driving force according to the information inputted from the travel controller 160.

<Steering Device 210>

The steering device 210 includes, for example, a steering ECU and an electric motor (both of which not shown). The electric motor, for example, exerts a force on the rack and pinion mechanism to change the direction of the steering wheel. The steering ECU drives the electric motor according to the information inputted from the vehicle control device 100, or the information on the steering angle or steering torque inputted, and changes the direction of the steering wheel.

<Brake Device 220>

The brake device 220 is, for example, an electric servo brake device including a brake caliper, a cylinder that transmits hydraulic pressure to the brake caliper, an electric motor that generates hydraulic pressure in the cylinder, and a braking controller (none of which is shown). The braking controller of the electric servo brake device controls the electric motor according to the information inputted from the travel controller 160 so that the brake torque corresponding to the braking operation is outputted to each wheel. The electric servo brake device may include, as a backup, a mechanism for transmitting the hydraulic pressure generated by the operation of the brake pedal 47 to the cylinder via the master cylinder.

Note that the brake device 220 is not limited to the electric servo brake device described above, and may be an electronically controlled hydraulic brake device. The electronically controlled hydraulic brake device controls the actuator according to the information inputted from the travel controller 160 to transmit the hydraulic pressure of the master cylinder to the cylinders. Further, the brake device 220 may include a regenerative brake by a traveling motor that may be included in the traveling driving force output device 200.

[Overview of Yaw Rate Estimating Device 300 According to the Present Invention]

Next, an outline of the yaw rate estimating device 300 according to the present invention provided in the vehicle control device 100 described above will be described with reference to FIG. 5.

Figure 5:
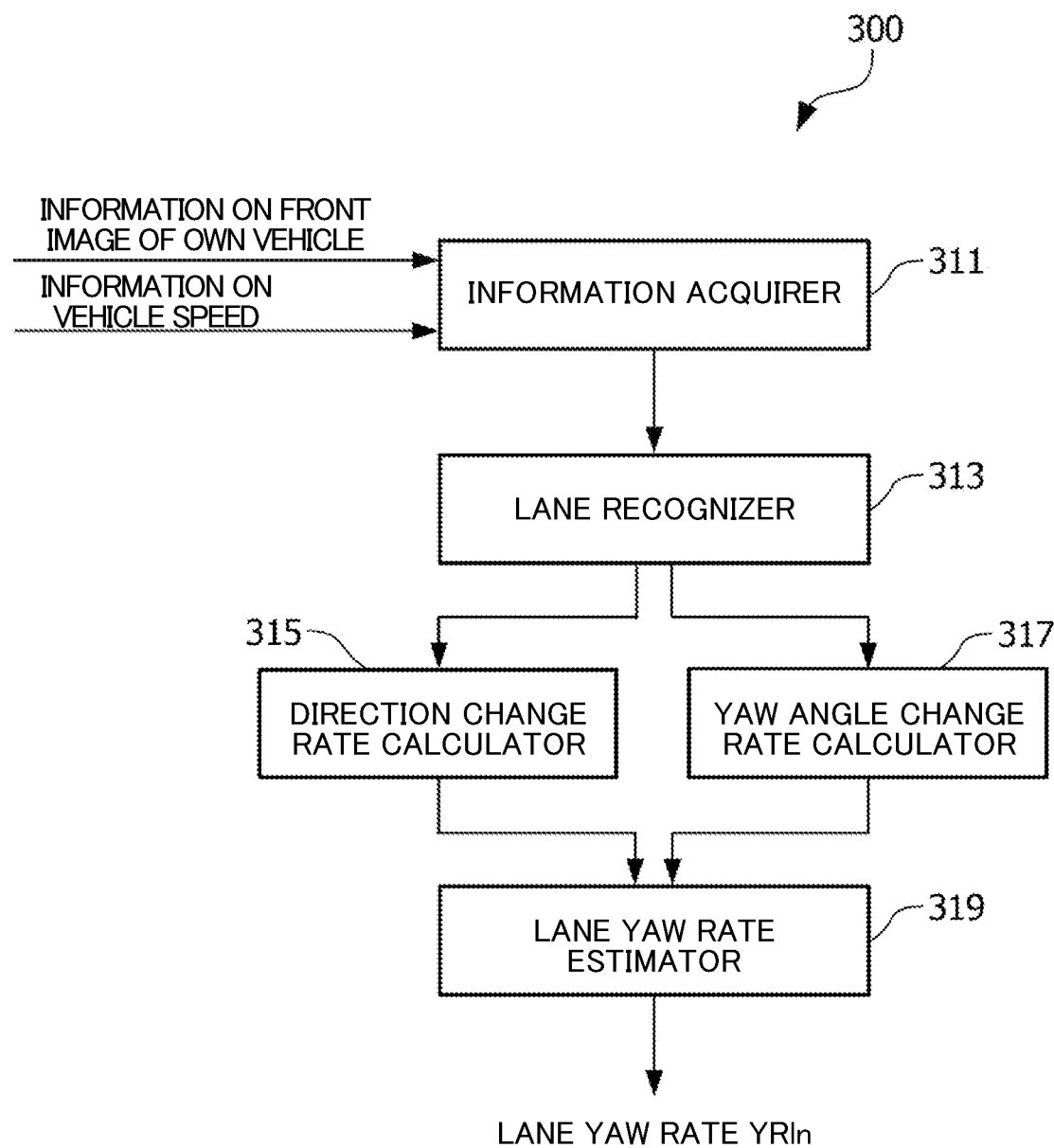
FIG. 5 is a block configuration diagram conceptually representing a lane yaw rate estimation function of the yaw rate estimating device according to the present invention.
Figure 6:
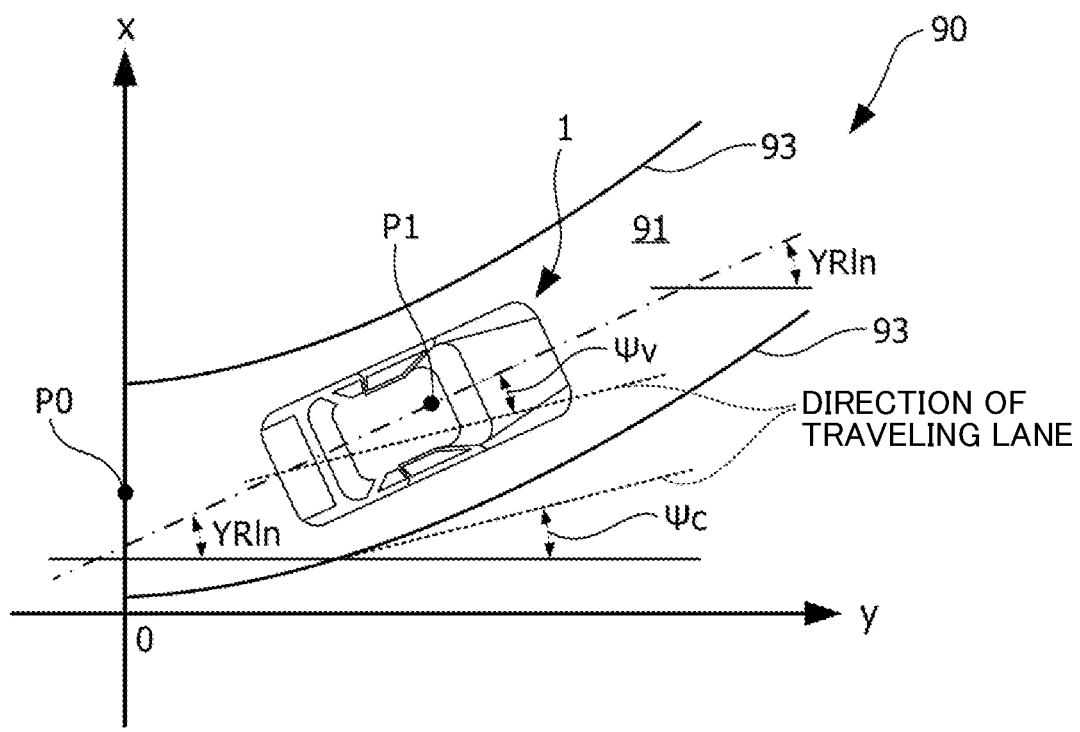
FIG. 6 is a bird's-eye view of the own vehicle provided for an outline explanation of the yaw rate estimating device according to the present invention.

FIG. 5 is a block configuration diagram conceptually representing a lane yaw rate estimation function of the yaw rate estimating device 300 according to the present invention. FIG. 6 is a bird's-eye view of the own vehicle 1 provided for an outline explanation of the yaw rate estimating device 300.

For example, in the case where the own vehicle 1 is an autonomous vehicle, it is strongly required to acquire the yaw rate embodying the yaw behavior of the own vehicle 1 with high precision in order to appropriately perform the traveling control of the own vehicle 1.

Therefore, in the yaw rate estimating device 300 according to the present invention, the concept of "lane yaw rate" is introduced in place of or in addition to the detected yaw rate which is a value detected by the conventional yaw rate sensor.

The yaw rate estimating device 300 has a function of estimating the yaw rate based on the information on the direction of the traveling lane 93 at the reference coordinates 90 (details will be described later) for the own vehicle 1 and the information on the yaw angle of the own vehicle 1 with respect to the direction of the traveling lane 93, in other words, based on the information on the traveling lane 93.

In the present specification, the yaw rate estimated based on the information on the traveling lane 93 is particularly referred to as "lane yaw rate." This is because in the present invention, it is necessary to handle the detected yaw rate YRsr, which is a value detected by the yaw rate sensor, separately from the lane yaw rate YRln.

More specifically, as shown in FIG. 5, the yaw rate estimating device 300 according to the present invention includes an information acquirer 311, a lane recognizer 313, a direction change rate calculator 315, a yaw angle change rate calculator 317, and a lane yaw rate estimator 319.

<Information Acquirer 311>

As shown in FIG. 5, the information acquirer 311 has a function of acquiring information on the front image of the own vehicle 1 and information on the vehicle speed. The information on the front image of the own vehicle 1 may be acquired via the camera 11 of the external environment sensor 10. Further, the vehicle speed information on the own vehicle 1 may be acquired via the vehicle speed sensor of the vehicle sensor 30.

The information on the front image of the own vehicle 1 and the information on the vehicle speed acquired by the information acquirer 311 are sent to the lane recognizer 313.

The information acquirer 311 is a functional unit included in the input/output interface (not shown) provided in the vehicle control device 100 shown in FIG. 2.

<Lane Recognizer 313>

As shown in FIGS. 5 and 6, the lane recognizer 313 has a function of recognizing the traveling lane 93 drawn on the traveling route 91 of the own vehicle 1 and the curvature of the traveling lane 93 based on the information on the front image of the own vehicle 1 acquired by the information acquirer 311.

In the lane recognizer 313, each pixel constituting the front image (peripheral image) of the own vehicle 1 acquired with the camera 11 is expanded and mapped in a three-dimensional coordinate system whose origin is the mounting portion of the camera 11 (for example, the vicinity of the rear-view mirror in the passenger compartment). This three-dimensional coordinate system is defined with the vehicle width direction of the own vehicle 1 as the x-axis, the vehicle length direction (traveling direction) as the y-axis, and the vehicle height direction (vertical direction) as the z-axis.

In the embodiment of the present invention, in the lane recognizer 313, each pixel constituting the front image of the own vehicle 1 in the three-dimensional coordinate system is subjected to coordinate transformation (projection transformation) one-to-one to the corresponding pixel constituting the bird's-eye view image (planar view image) of the own vehicle 1 viewed from above, as shown in FIG. 6. The individual pixels constituting this bird's-eye view image are expanded and mapped in a two-dimensional coordinate system whose origin is a predetermined position. As shown in FIG. 6, the two-dimensional coordinate system on which the bird's-eye view image of the own vehicle 1 is expanded (hereinafter referred to as "reference coordinates 90 for the own vehicle 1") is defined with the vehicle width direction of the own vehicle 1 as the x-axis and the vehicle length direction as the y-axis.

In the example shown in FIG. 6, the own vehicle 1 is traveling along the traveling lane 93 with a gentle left curve drawn on the traveling route 91 at an arbitrary point P1 on the reference coordinates 90 for the own vehicle 1.

The lane recognizer 313 is a functional unit included in the recognizer 140 of the vehicle control device 100 shown in FIG. 2.

More specifically, the lane recognizer 313 recognizes the traveling lane 93 and the curvature of the traveling lane 93 by associating an approximate curve composed of an $n^{th}$-order (where n is an integer of 2 or more) polynomial as the trajectory of the traveling lane 93 drawn on the traveling route 91 of the own vehicle 1.

In fact, the lane recognizer 313 obtains the $n^{th}$-order polynomial based on continuous time series values (past sample values traced back from the present time) of (n+1) or more including the value in question (current value) relating to the trajectory of the traveling lane 93. For example, when (n=2) is set, the trajectory (approximate curve) of the traveling lane 93 shown in FIG. 6 can be represented by the following quadratic polynomial (Formula 1).

$$x = f(y) = k_2 \cdot y^2 + k_1 \cdot y^1 + k_0 \qquad \text{(Formula 1)}$$

In formula 1, $k_2$, $k_1$, and $k_0$ are a second-order coefficient, first-order coefficient, and zeroth-order coefficient, respectively.

The second-order coefficient $k_2$ corresponds to the curvature component of the traveling lane 93. The first-order coefficient $k_1$ corresponds to the yaw angle component of the own vehicle 1 with respect to the direction of the traveling lane 93. The zeroth-order coefficient $k_0$ corresponds to the dimensional component in the x-axis direction (vehicle width direction) of the traveling lane 93 with respect to the own vehicle 1.

Note that when the trajectory (approximate curve) of the traveling lane 93 is represented by a quadratic polynomial, for example, one may appropriately refer to the technical matters described in paragraphs 0020 to 0021 of Patent Document (JP2019-131149A).

<Direction Change Rate Calculator 315>

As shown in FIGS. 5 and 6, the direction change rate calculator 315 calculates the change rate $\Psi c$ (see FIG. 6) of the direction of the traveling lane 93 on the reference coordinates 90 for the own vehicle 1 based on the information on the curvature of the traveling lane 93 recognized by the lane recognizer 313 and the vehicle speed acquired by the information acquirer 311.

Note that the direction change rate calculator 315 may calculate the curvature of the traveling lane 93 based on the second-order coefficient of the $n^{th}$-order polynomial obtained by the lane recognizer 313.

Here, the curvature of the traveling lane 93 is an index indicating the degree of curve of the line at an arbitrary point P1 on the traveling lane 93. The curvature of the traveling lane 93 takes a larger value as the degree of curve of the line at an arbitrary point P1 is larger (the curve is steeper), and takes a smaller value as the degree of curve of the line at an arbitrary point P1 is smaller (the curve is gentler).

Further, the change rate of the direction of the traveling lane 93 on the reference coordinates 90 for the own vehicle 1 is an index indicating, when the own vehicle 1 has moved from the reference point P0 (see FIG. 6) on the traveling lane 93 to an arbitrary point P1, the degree of change in the direction at the arbitrary point P1 after the movement with respect to the direction of the traveling lane 93 at the reference point P0 in a predetermined elapsed time (t(P1)−t(P0): time at arbitrary point P1−time at reference time P0).

Specifically, the change rate $\Psi c$ (see FIG. 6) of the direction of the traveling lane 5 at the arbitrary point P1 on the reference coordinates 90 for the own vehicle 1 can be calculated by multiplying the curvature at the arbitrary point P1 on the traveling lane 93 on the reference coordinates 90 for the own vehicle 1 by the vehicle speed (m/s).

The change rate $\Psi c$ of the direction of the traveling lane 93 calculated by the direction change rate calculator 315 is sent to the lane yaw rate estimator 319.

The direction change rate calculator 315 is a functional unit included in the recognizer 140 of the vehicle control device 100 shown in FIG. 2.

<Yaw Angle Change Rate Calculator 317>

As shown in FIGS. 5 and 6, the yaw angle change rate calculator 317 calculates the change rate $\Psi v$ (see FIG. 6) of the yaw angle of the own vehicle 1 with respect to the direction of the traveling lane 93 on the reference coordinates 90 for the own vehicle 1 based on the information on the curvature of the traveling lane 93 recognized by the lane recognizer 313 and the vehicle speed acquired by the information acquirer 311.

Note that the yaw angle change rate calculator 317 may calculate the change rate $\Psi v$ of the yaw angle of the own vehicle 1 while also obtaining the yaw angle of the own vehicle 1 with respect to the direction of the traveling lane 93 based on the first-order coefficient of the $n^{th}$-order polynomial obtained by the lane recognizer 313.

Here, the yaw angle of the own vehicle 1 with respect to the direction of the traveling lane 93 on the reference coordinates 90 for the own vehicle 1 is an index indicating how much the yaw angle of the own vehicle 1 is tilted with respect to the direction of the traveling lane 93.

Further, the change rate $\Psi v$ (see FIG. 6) of the yaw angle of the own vehicle 1 with respect to the traveling lane 93 on the reference coordinates 90 for the own vehicle 1 is an index indicating, when the own vehicle 1 has moved from the reference point P0 (see FIG. 6) on the traveling lane 93 to an arbitrary point P1, the degree of change in the yaw angle of the own vehicle 1 with respect to the direction of the traveling lane 93 at the arbitrary point P1 after the movement in a predetermined elapsed time (time t(P1) at arbitrary point P1−time t(P0) at reference time P0).

The change rate $\Psi v$ of the yaw angle of the own vehicle 1 with respect to the direction of the traveling lane 93 calculated by the yaw angle change rate calculator 317 is sent to the lane yaw rate estimator 319.

The yaw angle change rate calculator 317 is a functional unit included in the recognizer 140 of the vehicle control device 100 shown in FIG. 2.

<Lane Yaw Rate Estimator 319>

The lane yaw rate estimator 319 (see FIGS. 2 and 5) estimates the lane yaw rate YRln, which is a yaw rate derived from the information on the curvature of the traveling lane 93 and the vehicle speed of the own vehicle 1 based on the change rate $\Psi c$ of the direction of the traveling lane 93 calculated by the direction change rate calculator 315 and the change rate $\Psi v$ of the yaw angle of the own vehicle 1 with respect to the direction of the traveling lane 93 calculated by the yaw angle change rate calculator 317.

Specifically, the lane yaw rate estimator 319 estimates the lane yaw rate YRln by adding the change rate $\Psi c$ of the direction of the traveling lane 93 and the change rate $\Psi v$ of the yaw angle of the own vehicle 1 with respect to the direction of the traveling lane 93.

The lane yaw rate estimator 319 is a functional unit included in the recognizer 140 of the vehicle control device 100 shown in FIG. 2.

[Operation of Yaw Rate Estimating Device 300 According to the Present Invention]

Next, the operation of the yaw rate estimating device 300 according to the present invention will be described with reference to FIGS. 5 and 6 as appropriate.

As shown in FIG. 5, the information acquirer 311 acquires information on the front image of the own vehicle 1 and information on the vehicle speed.

As shown in FIGS. 5 and 6, the lane recognizer 313 recognizes the traveling lane 93 drawn on the traveling route 91 of the own vehicle 1 and the curvature of the traveling lane 93 based on the information on the front image of the own vehicle 1 acquired by the information acquirer 311.

The direction change rate calculator 315 calculates the change rate $\Psi c$ (see FIG. 6) of the direction of the traveling lane 93 on the reference coordinates 90 for the own vehicle 1 based on the information on the curvature of the traveling lane 93 recognized by the lane recognizer 313 and the vehicle speed acquired by the information acquirer 311.

The yaw angle change rate calculator 317 calculates the change rate $\Psi v$ (see FIG. 6) of the yaw angle of the own vehicle 1 with respect to the direction of the traveling lane 93 on the reference coordinates 90 for the own vehicle 1 based on the information on the curvature of the traveling lane 93 recognized by the lane recognizer 313 and the vehicle speed acquired by the information acquirer 311.

The lane yaw rate estimator 319 estimates the lane yaw rate YRln, which is a yaw rate derived from the information on the curvature of the traveling lane 93 and the vehicle speed of the own vehicle 1 based on the change rate $\Psi c$ of the direction of the traveling lane 93 calculated by the direction change rate calculator 315 and the change rate $\Psi v$ of the yaw angle of the own vehicle 1 with respect to the direction of the traveling lane 93 calculated by the yaw angle change rate calculator 317.

[Configuration of Yaw Rate Estimating Device 320 According to the First Modification]

Next, the configuration of the yaw rate estimating device 320 according to the first modification will be described with reference to FIGS. 7 and 8.

Figure 7:
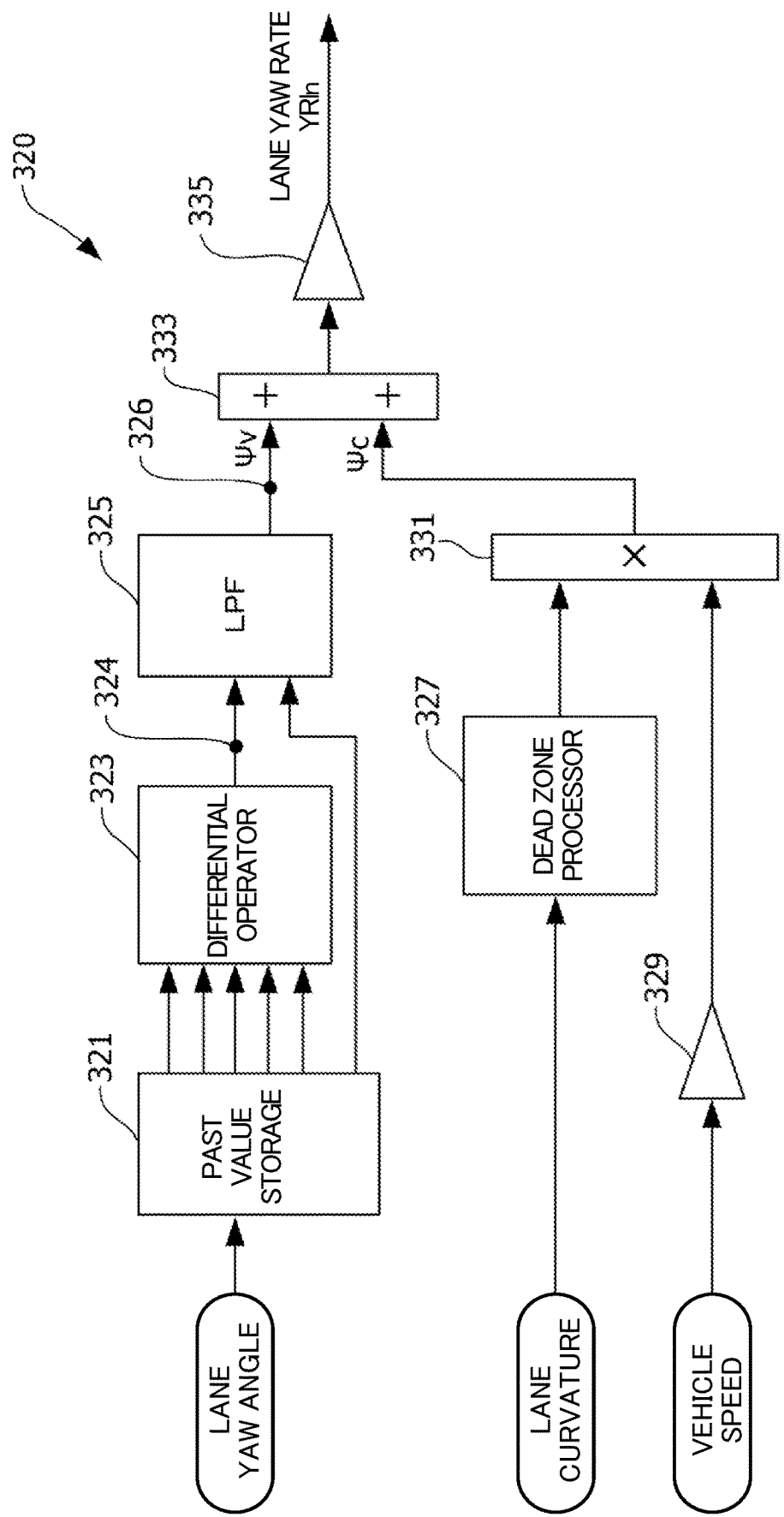
FIG. 7 is a functional block diagram showing a schematic configuration of a yaw rate estimating device according to a first modification.
Figure 8:
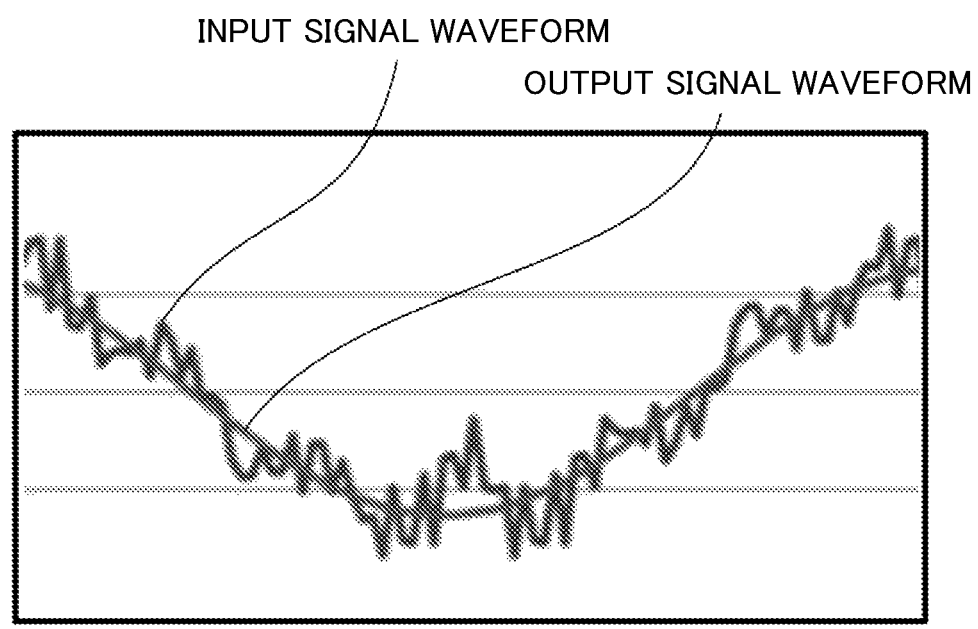
FIG. 8 is a diagram showing an example of an input signal waveform and an output signal waveform of a low-pass filter (LPF) provided in the yaw rate estimating device according to the first modification in comparison with each other.

FIG. 7 is a functional block diagram showing a schematic configuration of a yaw rate estimating device 320 according to a first modification. FIG. 8 is a diagram showing an example of an input signal waveform and an output signal waveform of a low-pass filter (LPF) 325 provided in the yaw rate estimating device 320 according to the first modification in comparison with each other.

The yaw rate estimating device 320 according to the first modification has a function of estimating the lane yaw rate based on the yaw angle of the own vehicle 1 with respect to the direction of the traveling lane 93 based on the trajectory of the traveling lane 93 (may be abbreviated as "lane yaw angle"), the curvature of the traveling lane 93 based on the trajectory of the traveling lane 93 (may be abbreviated as "lane curvature"), and the vehicle speed of own vehicle 1.

Comparing the yaw rate estimating device 300 according to the present invention and the yaw rate estimating device 320 according to the first modification, the yaw rate estimating device 300 according to the present invention includes a configuration according to the basic concept of the present invention, whereas the yaw rate estimating device 320 according to the first modification is different in that it includes a configuration embodying the present invention in addition to the configuration according to the basic concept of the present invention.

In order to achieve the function of estimating the lane yaw rate, the yaw rate estimating device 320 according to the first modification includes a past value storage 321, a differential operator 323, a low-pass filter (LPF) 325, a dead zone processor 327, a first gain adjuster 329, a multiplicator 331, an adder 333, and a second gain adjuster 335, as shown in FIG. 7.

The past value storage 321 has a function of temporarily storing time-series data of lane yaw angles (including the current value and a predetermined number of past values) sequentially acquired at predetermined time intervals (not particularly limited, for example, about 50 to 100 ms). The time-series data of lane yaw angles stored in the past value storage 321 is sent to the differential operator 323.

The differential operator 323 has a function of accurately grasping the fluctuation tendency of the time-series data of lane yaw angles of the own vehicle 1 that fluctuates from moment to moment by performing a differential operation on the time-series data of lane yaw angles stored in the past value storage 321. The time-series data of lane yaw angles after the differential operation by the differential operator 323 is sent to the LPF 325.

The LPF 325 has a function of smoothing out time-series data of lane yaw angles of the own vehicle 1 that fluctuates from moment to moment by removing the high frequency components included in the time-series data of lane yaw angles after the differential operation by the differential operator 323. FIG. 8 shows the input signal waveform of the signal input point 324 and the output signal waveform of the signal output point 326 in the front and rear stages of the LPF 325 in comparison with each other. It can be seen that the high frequency noise included in the time-series data of lane yaw angles has been removed by the removal of the high frequency components by LPF 325.

As a result, the time-series data of lane yaw angles after removing the high frequency components becomes high-value-added information that reproduces the actual behavior of the own vehicle 1.

The time-series data of lane yaw angles after removing the high frequency components by LPF 325 corresponds to the change rate $\Psi v$ of the yaw angle of the own vehicle 1 with respect to the direction of the traveling lane 93.

The time-series data of lane yaw angles after removing the high frequency components by LPF 325 is sent to the adder 333.

The dead zone processor 327 has the function of performing dead zone processing on time-series data of lane curvatures obtained sequentially at predetermined time intervals, deeming a traveling lane 93 that exhibits a lane curvature value that belongs to a predetermined curvature range relative to zero lane curvature (the traveling lane 93 is a straight line) to be a straight line. As a result, the traveling lane 93 that draws a gentle right curve and a left curve is regarded as a straight line without being considered in the estimation of the lane yaw rate YRln. The time-series data of lane curvatures after the dead zone processing by the dead zone processor 327 is sent to the multiplicator 331.

The first gain adjuster 329 has a function of performing a predetermined gain adjustment on the time-series data of vehicle speeds of the own vehicle 1. As a result, the time-series data of vehicle speeds of the own vehicle 1 after the gain adjustment becomes the vehicle speed information of a scale suitable for estimating the lane yaw rate YRln.

The time-series data of vehicle speeds of the own vehicle 1 after the gain adjustment by the first gain adjuster 329 is sent to the multiplicator 331.

The multiplicator 331 has a function of multiplying the time-series data of lane curvatures after the dead zone processing by the dead zone processor 327 and the time-series data of vehicle speeds of the own vehicle 1 after the gain adjustment by the first gain adjuster 329. This multiplication makes it possible to obtain the change rate $\Psi c$ (see FIG. 6) of the direction of the traveling lane 5 at an arbitrary point P1 on the reference coordinates 90 for the own vehicle 1.

The change rate $\Psi c$ of the direction of the traveling lane 5, which is the multiplication result of the multiplicator 331, is sent to the adder 333.

The adder 333 has a function of adding the change rate $\Psi v$ of the yaw angle of the own vehicle 1 with respect to the direction of the traveling lane 93, which is the output of the LPF 325, and the change rate $\Psi c$ of the direction of the traveling lane 5, which is the multiplication result of the multiplicator 331. This addition makes it possible to obtain an estimated value of the lane yaw rate YRln for the own vehicle 1.

The estimated value of the lane yaw rate YRln for the own vehicle 1, which is the addition result of the adder 333, is sent to the second gain adjuster 335.

The second gain adjuster 335 has a function of performing a predetermined gain adjustment on the estimated value of the lane yaw rate YRln for the own vehicle 1. This gain adjustment makes it possible to obtain a highly precise estimated value of the lane yaw rate YRln that reproduces the behavior of the own vehicle 1.

[Operation of Yaw Rate Estimating Device 320 According to the First Modification]

Next, the operation of the yaw rate estimating device 320 according to the first modification will be described with reference to FIG. 7.

As shown in FIG. 7, the past value storage 321 temporarily stores the time-series data of lane yaw angles sequentially acquired at predetermined time intervals.

The differential operator 323 performs a differential operation on the time-series data of lane yaw angles stored in the past value storage 321. As a result, it is possible to accurately grasp the fluctuation tendency of the time-series data of lane yaw angles of the own vehicle 1 that fluctuates from moment to moment.

The LPF 325 removes the high frequency components included in the time-series data of lane yaw angles after the differential operation by the differential operator 323. This makes it possible to smooth out time-series data of lane yaw angles of the own vehicle 1 that fluctuates from moment to moment.

The dead zone processor 327 performs dead zone processing on time-series data of lane curvatures obtained sequentially at predetermined time intervals, deeming a traveling lane 93 that exhibits a lane curvature value that belongs to a predetermined curvature range relative to zero lane curvature (the traveling lane 93 is a straight line) to be a straight line. As a result, the traveling lane 93 that draws a gentle right curve and a left curve is regarded as a straight line without being considered in the estimation of the lane yaw rate YRln.

The first gain adjuster 329 performs a predetermined gain adjustment on the time-series data of vehicle speeds of the own vehicle 1. As a result, the time-series data of vehicle speeds of the own vehicle 1 after the gain adjustment becomes the vehicle speed information of a scale suitable for estimating the lane yaw rate.

The multiplicator 331 multiplies the time-series data of lane curvatures after the dead zone processing by the dead zone processor 327 and the time-series data of vehicle speeds of the own vehicle 1 after the gain adjustment by the first gain adjuster 329. This multiplication makes it possible to obtain the change rate Ψc (see FIG. 6) of the direction of the traveling lane 5 at an arbitrary point P1 on the reference coordinates 90 for the own vehicle 1.

The adder 333 adds the change rate Ψv of the yaw angle of the own vehicle 1 with respect to the direction of the traveling lane 93, which is the output of the LPF 325, and the change rate Ψc of the direction of the traveling lane 5, which is the multiplication result of the multiplicator 331. This addition makes it possible to obtain an estimated value of the lane yaw rate YRln for the own vehicle 1.

The second gain adjuster 335 performs a predetermined gain adjustment on the estimated value of the lane yaw rate YRln for the own vehicle 1. This gain adjustment makes it possible to obtain a highly precise estimated value of the lane yaw rate YRln that reproduces the behavior of the own vehicle 1.

The yaw rate estimating device 320 according to the first modification uses the estimated value of the lane yaw rate YRln outputted by the second gain adjuster 335 as the yaw rate of the own vehicle 1.

[Configuration of Yaw Rate Estimating Device 340 According to the Second Modification]

Next, the configuration of the yaw rate estimating device 340 according to the second modification will be described with reference to FIGS. 9A and 9B.

Figure 9A:
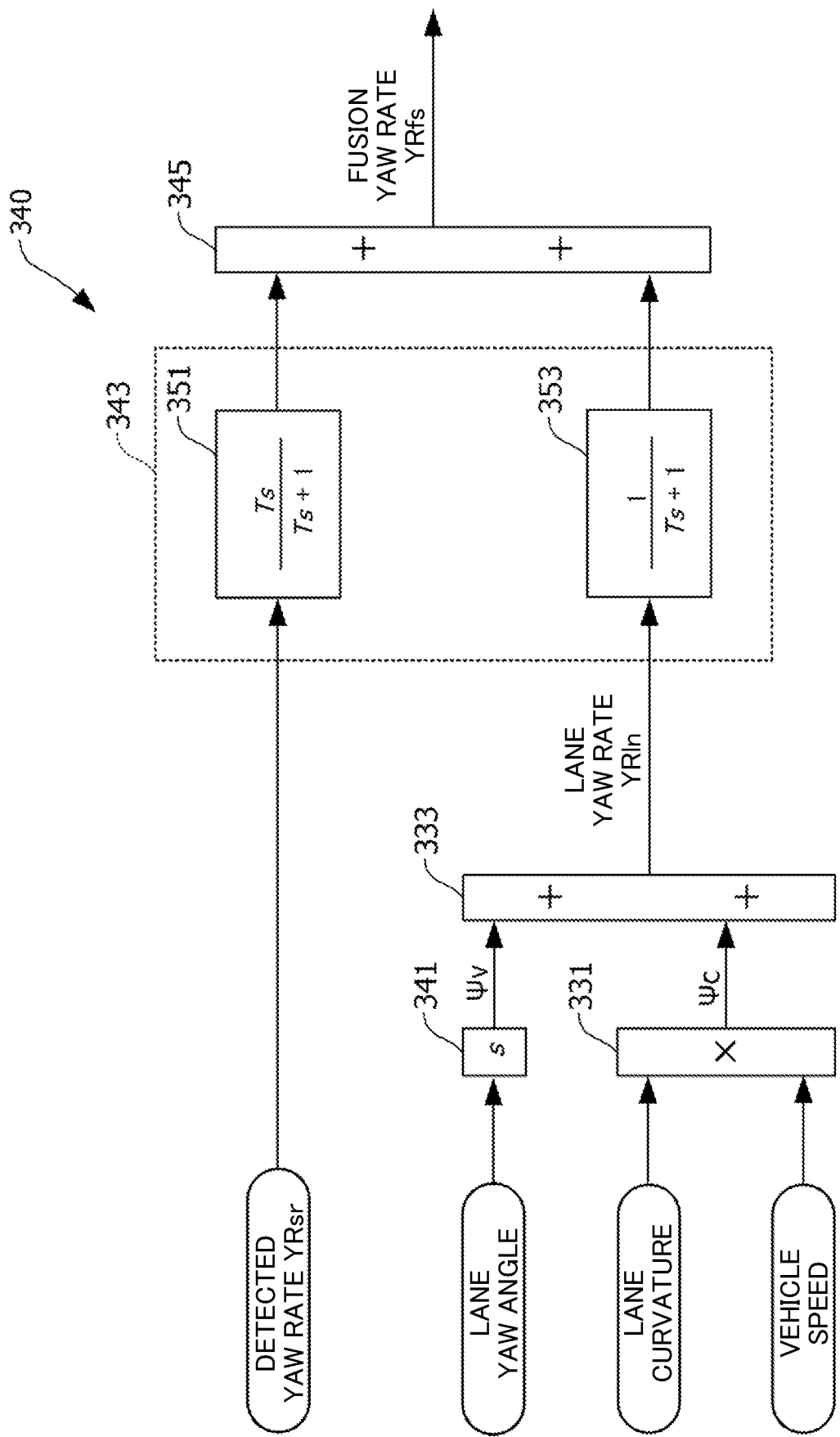
FIG. 9A is a functional block diagram showing a schematic configuration of a yaw rate estimating device according to a second modification.

FIG. 9A is a functional block diagram showing a schematic configuration of a yaw rate estimating device 340 according to a second modification. FIG. 9B is a diagram showing frequency characteristics of filter gains with respect to a detected yaw rate YRsr and a lane yaw rate YRln applied to a complementary filter 343 provided in the yaw rate estimating device 340 according to the second modification in comparison with each other.

The yaw rate estimating device 340 according to the second modification has a function of estimating the lane yaw rate YRln based on the lane yaw angle, the lane curvature, and the vehicle speed of the own vehicle 1, as well as generating a fusion yaw rate YRfs in which the estimated lane yaw rate YRln and the detected yaw rate YRsr detected by the yaw rate sensor are integrated at a predetermined ratio.

The difference between the yaw rate estimating device 320 according to the first modification and the yaw rate estimating device 340 according to the second modification is that the yaw rate estimating device 320 according to the first modification estimates the lane yaw rate YRln and uses the estimated lane yaw rate YRln as the yaw rate of the own vehicle 1, while the yaw rate estimating device 340 according to the second modification uses the fusion yaw rate YRfs, obtained by integrating the estimated detected yaw rate YRsr and the lane yaw rate YRln using a predetermined contribution ratio, as the yaw rate of the own vehicle 1.

Note that the yaw rate estimating device 340 according to the second modification is common to the yaw rate estimating device 320 according to the first modification in that it is premised on the configuration according to the basic concept of the present invention.

In order to achieve the fusion yaw rate generation function, as shown in FIG. 9A, the yaw rate estimating device 340 according to the second modification includes a merger 341, the multiplicator 331, the adder 333 (for all of which see FIG. 7), a complementary filter 343, and an integrator 345.

The merger 341 has a function of merging the past value storage 321, the differential operator 323, and the LPF 325 provided in the yaw rate estimating device 320 according to the first modification.

In short, the merger 341 temporarily stores the time-series data of lane yaw angles sequentially acquired at predetermined time intervals, performs a differential operation on the stored time-series data of lane yaw angles, and removes high frequency components included in the time-series data of lane yaw angles after the differential operation. As a result, the merger 341 outputs the change rate Ψv of the yaw angle of the own vehicle 1 with respect to the direction of the traveling lane 93.

The change rate Ψv of the yaw angle of the own vehicle 1 with respect to the direction of the traveling lane 93 outputted by the merger 341 is sent to the adder 333.

The multiplicator 331 multiplies the time-series data of lane curvatures and the time-series data of vehicle speeds of the own vehicle 1. This multiplication makes it possible to obtain the change rate Ψc (see FIG. 6) of the direction of the traveling lane 5 at an arbitrary point P1 on the reference coordinates 90 for the own vehicle 1.

The change rate Ψc of the direction of the traveling lane 5, which is the multiplication result of the multiplicator 331, is sent to the adder 333.

The adder 333 adds the change rate Ψv of the yaw angle of the own vehicle 1 with respect to the direction of the traveling lane 93 outputted by the merger 341 and the change rate Ψc of the direction of the traveling lane 5, which is the multiplication result of the multiplicator 331. This addition makes it possible to obtain an estimated value of the lane yaw rate YRln for the own vehicle 1.

The estimated value of the lane yaw rate YRln for the own vehicle 1, which is the addition result of the adder 333, is sent to the complementary filter 343.

The complementary filter 343 has a function of inputting time-series data relating to the detected yaw rate YRsr detected by the yaw rate sensor and time-series data relating to the estimated value of the lane yaw rate YRln for the own vehicle 1, performing a predetermined filter process on each time-series data, and outputting each time-series data after the filter process. The complementary filter 343 may include a digital filter.

In order to achieve the filter process function, the complementary filter 343 includes a first filter (HPF) 351 and a second filter (LPF) 353.

The first filter (HPF) 351 inputs time-series data relating to the detected yaw rate YRsr detected by the yaw rate sensor, performs a predetermined high-pass filter process (detailed below) on that time-series data, and outputs the time-series data after the high-pass filter process. This high-pass filter process is performed for the purpose of reducing the influence on the fusion yaw rate YRfs caused by a yaw angle error due to the midpoint drift of the yaw rate sensor in the low frequency band.

Figure 9B:
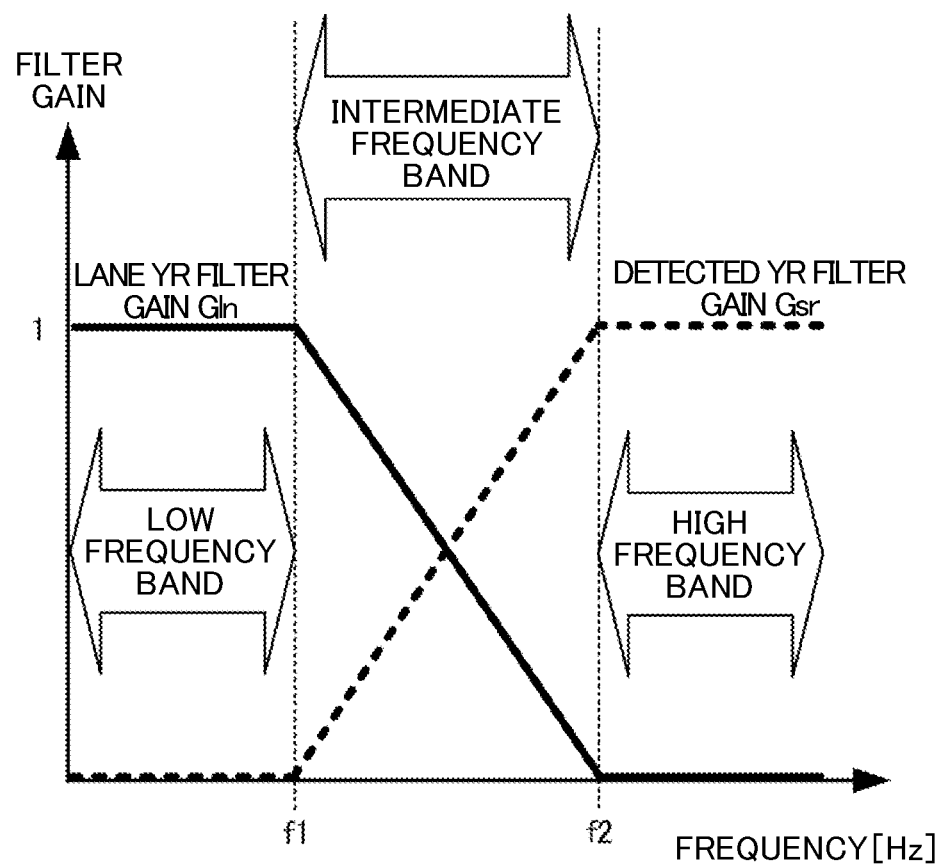
FIG. 9B is a diagram showing frequency characteristics of filter gains with respect to a lane yaw rate and a detected yaw rate applied to a complementary filter provided in the yaw rate estimating device according to the second modification in comparison with each other.

Specifically, in the high-pass filter process, when the detected YR frequency fsr presented by the time-series data relating to the detected yaw rate YRsr belongs to the low frequency band (detected YR frequency fsr=<first frequency threshold f1: see FIG. 9B), a fixed value (0) is set as the detected YR filter gain Gsr relating to the detected yaw rate YRsr.

Further, when the detected YR frequency fsr belongs to the intermediate frequency band (first frequency threshold f1<detected YR frequency fsr<second frequency threshold f2: see FIG. 9B), a variable that linearly increases from (0 to 1) with the gradual increase of the detected YR frequency fsr is set as the detected YR filter gain Gsr.

Then, when the detected YR frequency fsr belongs to the high frequency band (detected YR frequency fsr=>second frequency threshold f2: see FIG. 9B), a fixed value (1) is set as the detected YR filter gain Gsr.

Note that the first frequency threshold f1 and the second frequency threshold f2 are set to appropriate values based on the gist of the yaw rate estimating device 340 according to the second modification.

In the first filter (HPF) 351, the detected YR filter gain Gsr is applied as the contribution ratio of the detected yaw rate YRsr in order to variably set the contribution ratio of the detected yaw rate YRsr according to the height of the detected YR frequency fsr. This contributes to improving the precision of the fusion yaw rate YRfs by suppressing as much as possible the influence on the fusion yaw rate YRfs caused by a yaw angle error due to the midpoint drift of the yaw rate sensor in the low frequency band.

The output data of the first filter (HPF) 351 is sent to the integrator 345.

On the other hand, the second filter (LPF) 353 inputs time-series data relating to the lane yaw rate YRln of the own vehicle 1, performs a predetermined low-pass filter process (detailed below) on that time-series data, and outputs the time-series data after the filter process. This low-pass filter process is performed for the purpose of reducing the influence on the fusion yaw rate YRfs due to the lane yaw rate YRln in the high frequency band being inferior to the detected yaw rate YRsr in terms of immediate response (because the acquisition cycle of the lane yaw angle and lane curvature is relatively long).

That is, in the low-pass filter process, when the lane YR frequency f1$n$ presented by the time-series data relating to the lane yaw rate YRln belongs to the high frequency band (f1$n$=<f2: see FIG. 9B), a fixed value (0) is set as the lane YR filter gain Gln relating to the lane yaw rate YRln.

Further, when the lane YR frequency f1$n$ belongs to the intermediate frequency band (f1<f1$n$<f2: see FIG. 9B), a variable that linearly increases from (0 to 1) with the gradual decrease of the lane YR frequency fin is set as the lane YR filter gain Gln.

Then, when the lane YR frequency fin belongs to the low frequency band (f1$n$=<f1: see FIG. 9B), a fixed value (1) is set as the lane YR filter gain Gln.

In the second filter (LPF) 353, the lane YR filter gain Gln is applied as the contribution ratio of the lane yaw rate YRln in order to variably set the contribution ratio of the lane yaw rate YRln according to the height of the lane YR frequency fin.

This contributes to improving the precision of the fusion yaw rate YRfs by suppressing as much as possible the influence on the fusion yaw rate YRfs due to the lane yaw rate YRln in the high frequency band being inferior to the detected yaw rate YRsr in terms of immediate response.

The output data of the second filter (LPF) 353 is sent to the integrator 345.

Note that as shown in FIG. 9B, the sum of the respective filter gains of the first filter (HPF) 351 and the second filter (LPF) 353 is set to be 1 over all frequency bands. As a result, the weaknesses of the detected yaw rate YRsr and the lane yaw rate YRln can complement each other and the strengths can be mutually extended. As a result, further improvement of the precision of the fusion yaw rate YRfs can be expected.

The integrator 345 adds the time-series data relating to the detected yaw rate YRsr, which is the output of the first filter (HPF) 351, and the time-series data relating to the lane yaw rate YRln, which is the output of the second filter (LPF) 353, and thereby integrates both time-series data using a predetermined contribution ratio (see "filter gain" shown in FIG. 9B). As a result, the integrator 345 outputs a high-precision fusion yaw rate YRfs obtained by integrating the detected yaw rate YRsr and the lane yaw rate YRln.

The complementary filter 343 and the integrator 345 correspond to the "fusion yaw rate generator" of the present invention.

[Operation of Yaw Rate Estimating Device 340 According to the Second Modification]

Next, the operation of the yaw rate estimating device 340 according to the second modification will be described with reference to FIGS. 9A and 9B.

Note that it is common to the yaw rate estimating device 320 according to the first modification that the lane yaw rate YRln is estimated by the combination of the merger 341, the multiplicator 331, and the adder 333 (for all of which see FIG. 7). Therefore, the description of the operation for estimating the lane yaw rate YRln will be omitted. The explanation focusing on the operation of the complementary filter 343 and the integrator 345 will serve as the operation explanation of the yaw rate estimating device 340 according to the second modification.

The first filter (HPF) 351 provided in the complementary filter 343 inputs time-series data relating to the detected yaw rate YRsr detected by the yaw rate sensor, performs a predetermined high-pass filter process on that time-series data, and outputs the time-series data after the high-pass filter process. This high-pass filter process is performed for the purpose of reducing the influence on the fusion yaw rate YRfs caused by a yaw angle error due to the midpoint drift of the yaw rate sensor in the low frequency band (see FIG. 9B).

On the other hand, the second filter (LPF) 353 provided in the complementary filter 343 inputs time-series data relating to the lane yaw rate YRln of the own vehicle 1, performs a predetermined low-pass filter process on that time-series data, and outputs the time-series data after the filter process. This low-pass filter process is performed for the purpose of reducing the influence on the fusion yaw rate YRfs due to the lane yaw rate YRln in the high frequency band (see FIG. 9B) being inferior to the detected yaw rate YRsr in terms of immediate response.

The integrator 345 adds the time-series data relating to the detected yaw rate YRsr, which is the output of the first filter (HPF) 351, and the time-series data relating to the lane yaw rate YRln, which is the output of the second filter (LPF) 353, and thereby integrates both time-series data using a predetermined contribution ratio. As a result, the integrator 345 outputs a high-precision fusion yaw rate YRfs obtained by integrating the detected yaw rate YRsr and the lane yaw rate YRln.

The yaw rate estimating device 340 according to the second modification uses the fusion yaw rate YRfs outputted by the integrator 345 as the yaw rate of the own vehicle 1.

The yaw rate estimating device 340 according to the second modification makes it possible to suppress as much as possible the influence on the fusion yaw rate YRfs due to two the factors that a yaw angle error occurs due to the midpoint drift of the yaw rate sensor in the low frequency band (see FIG. 9B), and that the lane yaw rate YRln is inferior to the detected yaw rate YRsr in terms of immediate response in the high frequency band (see FIG. 9B). As a result, the precision of the fusion yaw rate YRfs can be further improved.

[Configuration of Yaw Rate Estimating Device 360 According to the Third Modification]

Next, the configuration of the yaw rate estimating device 360 according to the third modification will be described with reference to FIGS. 10A and 10B.

Figure 10A:
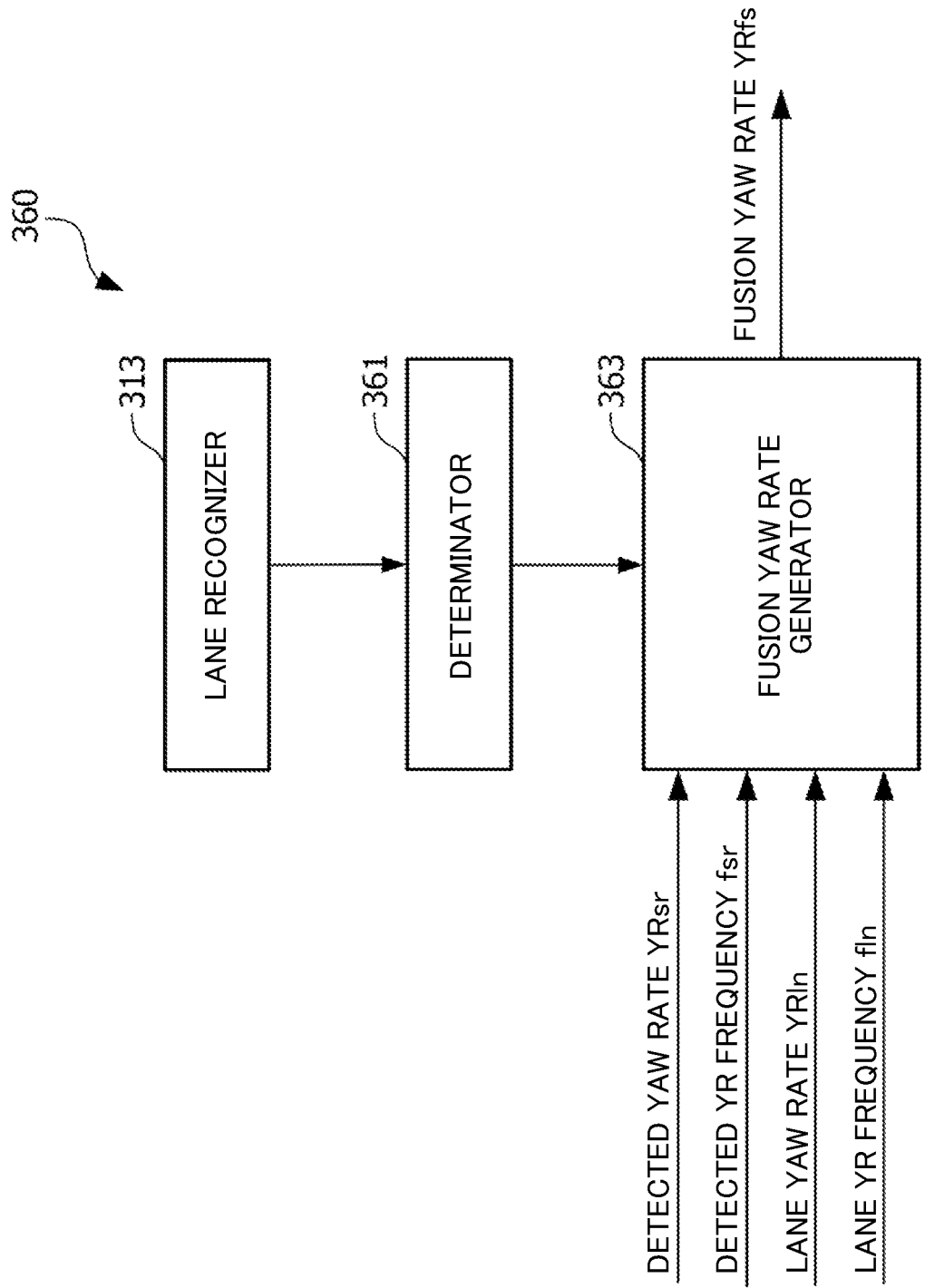
FIG. 10A is a functional block diagram showing a schematic configuration of a yaw rate estimating device according to a third modification.

FIG. 10A is a functional block diagram showing a schematic configuration of a yaw rate estimating device 360 according to a third modification. FIG. 10B is a diagram showing a lane length-gain characteristic provided in a determinator 361 of the yaw rate estimating device 360 according to the third modification.

The yaw rate estimating device 360 according to the third modification further has a function of variably setting the contribution ratio of the lane yaw rate YRln according to the length of the lane length LL relating to the traveling lane 93 recognized by the lane recognizer 313, in addition to the fusion yaw rate generation function of the yaw rate estimating device 340 according to the second modification.

Here, the contribution ratio of the lane yaw rate YRln is variably set according to the length of the lane length LL relating to the traveling lane 93 for the following reason. Specifically, in the case where the lane length LL relating to the traveling lane 93 is relatively short, the estimation precision of the lane yaw angle and the lane curvature (estimation precision of the lane yaw rate YRln) is lowered. Therefore, the contribution ratio of the lane yaw rate YRln is reduced in the case where the lane length LL relating to the traveling lane 93 is relatively short, the purpose is to improve the precision of the fusion yaw rate YRfs.

Note that the yaw rate estimating device 360 according to the third modification is common to the yaw rate estimating devices 320 and 340 according to the first and second modifications in that it is premised on the configuration according to the basic concept of the present invention.

In order to achieve the function of variably setting the contribution ratio of the lane yaw rate YRln, as shown in FIG. 10A, the yaw rate estimating device 360 according to the third modification includes the lane recognizer 313 (see FIG. 5), the determinator 361, and the fusion yaw rate generator 363.

Based on the information of the front image of the own vehicle 1 acquired by the information acquirer 311 (see FIG. 5), the lane recognizer 313 further has a function of recognizing the lane length LL, which is the continuous length of the recognized traveling lane 93, in addition to the basic function of recognizing the traveling lane 93 (see FIG. 6) drawn on the traveling route 91 of the own vehicle 1 and the curvature of the traveling lane 93. Note that in the case where the traveling lane 93 cannot be recognized by the lane recognizer 313, the lane length LL relating to the traveling lane 93 is treated as zero.

Information on the lane length LL relating to the traveling lane 93 recognized by the lane recognizer 313 is sent to the determinator 361.

Figure 10B:
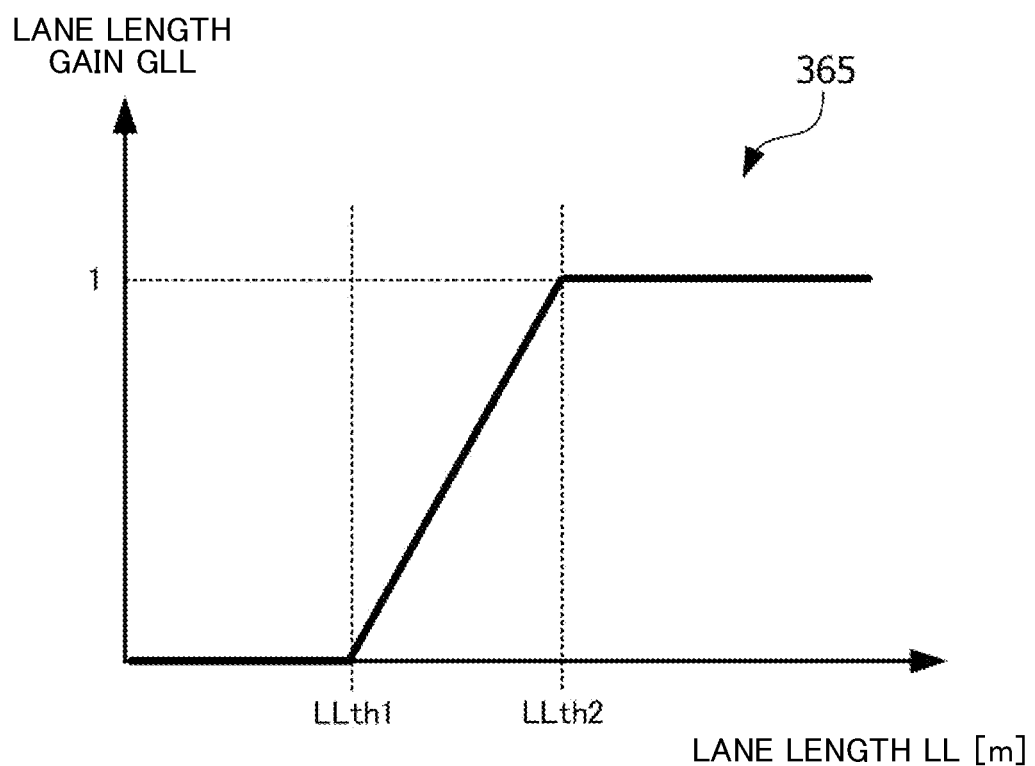
FIG. 10B is a diagram showing a lane length-gain characteristic provided in a determinator of the yaw rate estimating device according to the third modification.

The determinator 361 determines whether or not the lane length LL relating to the traveling lane 93 recognized by the lane recognizer 313 is equal to or less than a predetermined first lane length threshold LLth1 (see FIG. 10B). Further, when the lane length LL recognized by the lane recognizer 313 exceeds the first lane length threshold LLth1, the determinator 361 further determines whether or not the lane length LL is equal to or less than a predetermined second lane length threshold LLth2 (see FIG. 10B).

The determination result of the lane length LL relating to the traveling lane 93 by the determinator 361 is sent to the fusion yaw rate generator 363.

As a result of the determination of the lane length LL relating to the traveling lane 93 by the determinator 361, when it is determined that the lane length LL is equal to or less than the first lane length threshold LLth1 (see FIG. 10B), the fusion yaw rate generator 363 sets the value of the lane length gain GLL to a fixed value (0) indicating that the lane yaw rate YRln is invalid.

Further, as a result of the determination of the lane length LL relating to the traveling lane 93 by the determinator 361, when it is determined that the lane length LL exceeds the first lane length threshold LLth1 but is less than the second lane length threshold LLth2 (see FIG. 10B), the fusion yaw rate generator 363 sets the value of the lane length gain GLL to a variable (0 to 1: a value exceeding 0 and less than 1) according to the lane length LL, the value indicating that the lane length YRln is effective.

Then, as a result of the determination of the lane length LL relating to the traveling lane 93 by the determinator 361, when it is determined that the lane length LL is equal to or greater than the second lane length threshold LLth2 (see FIG. 10B), the fusion yaw rate generator 363 sets the value of the lane length gain GLL to a fixed value (1) indicating that the lane yaw rate YRln is effective and particularly excellent.

Next, a description is provided described with reference to FIG. 10B on a mechanism for the fusion yaw rate generator 363 to variably set the contribution ratio of the lane yaw rate YRln according to the length of the lane length LL relating to the traveling lane 93 recognized by the lane recognizer 313.

As shown in FIG. 10B, the fusion yaw rate generator 363 stores a lane length-lane length gain table 365 associated with the value of the lane length gain GLL with respect to the change in the lane length LL relating to the traveling lane 93.

As shown in FIG. 10B, when the lane length LL relating to the traveling lane 93 is equal to or less than the first lane length threshold LLth1, the lane length-lane length gain table 365 is associated with a fixed value (0) as the value of the lane length gain GLL.

Further, when the lane length LL relating to the traveling lane 93 exceeds the first lane length threshold LLth1 but is equal to or less than the second lane length threshold LLth2, the lane length-lane length gain table 365 is associated with a variable that linearly increases from (0 to 1) with the increase of the lane length LL as the value of the lane length gain GLL.

Then, when the lane length LL relating to the traveling lane 93 exceeds the second lane length threshold LLth2, the lane length-lane length gain table 365 is associated with a fixed value (1) as the value of the lane length gain GLL.

The fusion yaw rate generator 363 multiplies the contribution ratio of the lane yaw rate YRln, which is variably set according to the height of the lane YR frequency f1$n$, by the lane length gain GLL (where GLL=<1), which is variably set according to the length of the lane length LL relating to the traveling lane 93. As a result, the contribution ratio of the lane yaw rate YRln is variably set in two steps according to the height of the lane YR frequency f1$n$ and further according to the length of the lane length LL relating to the traveling lane 93.

As a result, it is possible to suppress as much as possible the influence on the fusion yaw rate YRfs caused by a yaw angle error due to the midpoint drift of the yaw rate sensor in the low frequency band (see FIG. 9B) and the influence on the fusion yaw rate YRfs due to the lane yaw rate YRln in the high frequency band (see FIG. 9B) being inferior to the detected yaw rate YRsr in terms of immediate response, and in addition, the contribution ratio of the lane yaw rate YRln is reduced in the case where the lane length LL relating to the traveling lane 93 is relatively short, so that the precision of the fusion yaw rate YRfs can be further improved.

Note that in the case where the lane length LL relating to the traveling lane 93 is relatively short, when a variable setting for reducing the contribution ratio of the lane yaw rate YRln (lane YR filter gain Gln) is made, the contribution ratio of the detected yaw rate YRsr (detected YR filter gain Gsr) is increased in conjunction with this. This is because, as described above, the sum of the respective filter gains in the first filter (HPF) 351 and the second filter (LPF) 353 is set to be 1 over all frequency bands.

[Operation of Yaw Rate Estimating Device 360 According to the Third Modification]

Next, the operation of the yaw rate estimating device 360 according to the third modification will be described with reference to FIGS. 10A and 10B.

As shown in FIG. 10A, based on the information of the front image of the own vehicle 1 acquired by the information acquirer 311 (see FIG. 5), the lane recognizer 313 recognizes the lane length LL, which is the continuous length of the recognized traveling lane 93, in addition to recognizing the traveling lane 93 (see FIG. 6) drawn on the traveling route 91 of the own vehicle 1 and the curvature of the traveling lane 93.

The determinator 361 determines whether or not the lane length LL relating to the traveling lane 93 recognized by the lane recognizer 313 is equal to or less than the first lane length threshold LLth1 (see FIG. 10B). Further, when the lane length LL recognized by the lane recognizer 313 exceeds the first lane length threshold LLth1, the determinator 361 further determines whether or not the lane length LL is equal to or less than the second lane length threshold LLth2 (see FIG. 10B).

The fusion yaw rate generator 363 variably sets the contribution ratio of the lane yaw rate YRln based on the determination result of the lane length LL relating to the traveling lane 93 by the determinator 361.

Specifically, when the lane length LL relating to the traveling lane 93 recognized by the lane recognizer 313 is equal to or less than the first lane length threshold LLth1, the fusion yaw rate generator 363 is set to reduce the contribution ratio (lane length gain GLL) of the lane yaw rate YRln as compared with the case where the lane length LL exceeds the first lane length threshold LLth1 (GLL=0).

Further, when the lane length LL relating to the traveling lane 93 recognized by the lane recognizer 313 exceeds the first lane length threshold LLth1 but is equal to or less than the second lane length threshold LLth2 (see FIG. 10B), the fusion yaw rate generator 363 is variably set so as to reduce the contribution ratio (lane length gain GLL) of the lane yaw rate YRln (0<GLL<1) as compared with the case where the lane length LL exceeds the second lane length threshold LLth2 (GLL=1).

Then, when the lane length LL relating to the traveling lane 93 recognized by the lane recognizer 313 exceeds the second lane length threshold LLth2 (see FIG. 10B), the fusion yaw rate generator 363 sets the contribution ratio (lane length gain GLL) of the lane yaw rate YRln to a fixed value (GLL=1) as a norm.

Next, the fusion yaw rate generator 363 multiplies the contribution ratio of the lane yaw rate YRln, which is variably set according to the height of the lane YR frequency f1$n$, by the lane length gain GLL, which is variably set according to the length of the lane length LL relating to the traveling lane 93. As a result, the contribution ratio of the lane yaw rate YRln set according to the height of the lane YR frequency f1$n$ is corrected according to the length of the lane length LL relating to the traveling lane 93.

Here, the lane length gain GLL is set to a value that does not exceed 1 (GLL=<1). Therefore, even when the lane length LL exceeds the second lane length threshold LLth2 (GLL=1), the contribution ratio of the lane yaw rate YRln set according to the height of the lane YR frequency f1$n$ does not increase.

Next, the fusion yaw rate generator 363 adds the time-series data relating to the detected yaw rate YRsr and the time-series data relating to the lane yaw rate YRln. This integrates both time-series data relating to the detected yaw rate YRsr and the lane yaw rate YRln using the contribution ratio of lane yaw rate YRln that has been set according to the height of the lane YR frequency f1$n$ and has been corrected according to the length of the lane length LL relating to the traveling lane 93.

The fusion yaw rate generator 363 outputs a high-precision fusion yaw rate YRfs obtained by integrating the detected yaw rate YRsr and the lane yaw rate YRln.

The yaw rate estimating device 360 according to the third modification uses the fusion yaw rate YRfs obtained by integrating the detected yaw rate YRsr and the lane yaw rate YRln as the yaw rate of the own vehicle 1.

The yaw rate estimating device 360 according to the third modification suppresses as much as possible the influence on the fusion yaw rate YRfs due to two the factors that a yaw angle error occurs due to the midpoint drift of the yaw rate sensor in the low frequency band (see FIG. 9B), and that the lane yaw rate YRln is inferior to the detected yaw rate YRsr in terms of immediate response in the high frequency band (see FIG. 9B), and in addition, the contribution ratio of the lane yaw rate YRln is reduced in the case where the lane length LL relating to the traveling lane 93 is relatively short, so that the influence on the fusion yaw rate YRfs caused by the decrease in the estimation precision of the lane yaw angle and the lane curvature is suppressed as much as possible. As a result, the precision of the fusion yaw rate YRfs can be further improved.

[Operations and Effects of Yaw Rate Estimating Device 300 According to the Present Invention]

Next, the operations and effects of the yaw rate estimating device 300 according to the present invention will be described with reference to appropriate drawings.

Note that the each of the yaw rate estimating device 320 according to the first modification, the yaw rate estimating device 340 according to the second modification, and the yaw rate estimating device 360 according to the third modification belongs to the category of the yaw rate estimating device 300 according to the present invention.

Therefore, in the description of the yaw rate estimating device 300 according to the present invention, the yaw rate estimating device according to any of the modifications may correspond to the yaw rate estimating device 300, which is written in parentheses.

As shown in FIG. 5, a yaw rate estimating device 300 based on a first aspect includes an information acquirer 311 that acquires information on a front image of an own vehicle 1 and information on a vehicle speed; a lane recognizer 313 that recognizes a traveling lane 93 (see FIG. 6) drawn on a traveling route 91 of the own vehicle 1 and a curvature of the traveling lane 93 based on the information on the acquired front image of the own vehicle 1; a direction change rate calculator 315 that calculates a change rate Ψc of a direction of the traveling lane 93 on reference coordinates 90 for the own vehicle 1 (see FIG. 6) based on the information on the recognized curvature of the traveling lane 93 and the acquired vehicle speed; a yaw angle change rate calculator 317 that calculates a change rate Ψv of a yaw angle of the own vehicle with respect to the direction of the traveling lane 93 on the reference coordinates 90 for the own vehicle 1 based on the information on the recognized curvature of the traveling lane 93 and the acquired vehicle speed; and a lane yaw rate estimator 319 that estimates a lane yaw rate YRln, which is a yaw rate derived from the information on the curvature of the traveling lane 93 and the vehicle speed of the own vehicle 1, based on the change rate Ψc of the direction of the traveling lane 93 calculated by the direction change rate calculator 315 and the change rate Ψv of the yaw angle of the own vehicle 1 with respect to the direction of the traveling lane 93 calculated by the yaw angle change rate calculator 317.

The yaw rate estimating device 300 based on the first aspect uses the estimated lane yaw rate YRln as the yaw rate of the own vehicle 1.

In the yaw rate estimating device 300 based on the first aspect, the information acquirer 311 acquires the information on the front image of the own vehicle 1 and the information on the vehicle speed. The lane recognizer 313 recognizes the traveling lane 93 drawn on the traveling route 91 of the own vehicle 1 and the curvature of the traveling lane 93 based on the information on the acquired front image of the own vehicle 1. The direction change rate calculator 315 calculates the change rate Ψc of the direction of the traveling lane 93 on the reference coordinates 90 for the own vehicle 1 based on the information on the recognized curvature of the traveling lane 93 and the acquired vehicle speed. The yaw angle change rate calculator 317 calculates the change rate Ψv of the yaw angle of the own vehicle with respect to the direction of the traveling lane 93 on the reference coordinates 90 for the own vehicle 1 based on the information on the recognized curvature of the traveling lane 93 and the acquired vehicle speed. The lane yaw rate estimator 319 estimates the lane yaw rate YRln, which is a yaw rate derived from the information on the curvature of the traveling lane 93 and the vehicle speed of the own vehicle 1, based on the change rate Ψc of the direction of the traveling lane 93 calculated by the direction change rate calculator 315 and the change rate Ψv of the yaw angle of the own vehicle 1 with respect to the direction of the traveling lane 93 calculated by the yaw angle change rate calculator 317.

The yaw rate estimating device 300 based on the first aspect uses the lane yaw rate YRln estimated by the lane yaw rate estimator 319 as the yaw rate of the own vehicle 1.

The yaw rate estimating device 300 based on the first aspect estimates the lane yaw rate YRln based on the information on the curvature of the traveling lane 93 drawn on the traveling route 91 of the own vehicle 1 and the vehicle speed of the own vehicle 1, and uses the estimated lane yaw rate YRln as the yaw rate of the own vehicle 1, and thus can estimate with high precision the yaw rate that expresses the yaw behavior of the own vehicle 1 that fluctuates from moment to moment.

Further, a yaw rate estimating device 300 based on a second aspect is the yaw rate estimating device 300 based on the first aspect that may employ a configuration in which the lane recognizer 313 recognizes the traveling lane 93 and the curvature of the traveling lane 93 by associating an approximate curve composed of an $n^{th}$-order (where n is an integer of 2 or more) polynomial as a trajectory of the traveling lane 93 drawn on the traveling route 91 of the own vehicle 1, the direction change rate calculator 315 obtains the curvature of the traveling lane 93 based on a second-order coefficient of the $n^{th}$-order polynomial, and the yaw angle change rate calculator 317 obtains the yaw angle of the own vehicle 1 with respect to the direction of the traveling lane 93 based on a first-order coefficient of the $n^{th}$-order polynomial.

According to the yaw rate estimating device 300 based on the second aspect, the direction change rate calculator 315 obtains the curvature of the traveling lane 93 based on the second-order coefficient of the $n^{th}$-order polynomial as the trajectory of the traveling lane 93 drawn on the traveling route 91 of the own vehicle 1, and the yaw angle change rate calculator 317 obtains the yaw angle of the own vehicle 1 with respect to the direction of the traveling lane 93 based on the first-order coefficient of the $n^{th}$-order polynomial, so that in addition to the operations and effects of the yaw rate estimating device 300 based on the first aspect, it is possible to accurately acquire the basic information for estimating the lane yaw rate YRln.

Further, a yaw rate estimating device 300 based on a third aspect is the yaw rate estimating device 300 based on the second aspect that may employ a configuration in which the lane recognizer 313 obtains the $n^{th}$-order polynomial based on continuous time series values of (n+1) or more including a value in question relating to the trajectory of the traveling lane 93, and the yaw angle change rate calculator 317 calculates the change rate of the yaw angle of the own vehicle 1 based on the first-order coefficient of the obtained $n^{th}$-order polynomial.

According to the yaw rate estimating device 300 based on the third aspect, the yaw angle change rate calculator 317 calculates the change rate of the yaw angle of the own vehicle 1 based on the first-order coefficient of the obtained $n^{th}$-order polynomial, so that in addition to the operations and effects of the yaw rate estimating device 300 based on the second aspect, it is possible to even more accurately acquire the basic information for estimating the lane yaw rate YRln.

Further, a yaw rate estimating device 300 based on the fourth aspect (yaw rate estimating device 320 according to the first modification) is the yaw rate estimating device 300 based on the third aspect that may employ a configuration which further includes a low-pass filter 325 (see FIG. 7) that extracts a low frequency component relating to a time-series signal of the change rate of the yaw angle of the own vehicle 1 calculated by the yaw angle change rate calculator 317.

According to the yaw rate estimating device 300 based on the fourth aspect (yaw rate estimating device 320 according to the first modification), a low-pass filter 325 that extracts a low frequency component relating to a time-series signal of the change rate of the yaw angle of the own vehicle 1 calculated by the yaw angle change rate calculator 317 is further included, so that in addition to the operations and effects of the yaw rate estimating device 300 based on the third aspect, it is possible to accurately estimate the yaw behavior of the own vehicle 1 by removing high frequency component noise.

Further, a yaw rate estimating device 300 based on a fifth aspect is the yaw rate estimating device 300 based on any one of the first to fourth aspects (yaw rate estimating device 320 according to the first modification) that may employ a configuration which further includes a dead zone processor 327 (see FIG. 7) that performs dead zone processing on a signal relating to the curvature of the traveling lane recognized by the lane recognizer, wherein the direction change rate calculator 315 calculates the change rate of the direction of the traveling lane 93 on the reference coordinates 90 for the own vehicle 1 based on the information on the curvature of the traveling lane 93 after the dead zone processing and the acquired vehicle speed.

According to the yaw rate estimating device 300 based on the fifth aspect (yaw rate estimating device 320 according to the first modification), the direction change rate calculator calculates the change rate of the direction of the traveling lane 93 on the reference coordinates 90 for the own vehicle 1 based on the information on the curvature of the traveling lane 93 after the dead zone processing and the acquired vehicle speed, so that in addition to the operations and effects of the yaw rate estimating device 300 based on any one of the first to fourth aspects, it is possible to accurately estimate the yaw rate that embodies the yaw behavior of the own vehicle 1 that fluctuates from moment to moment by removing noise near the midpoint of the steering angle on the signal relating to the curvature of the traveling lane.

Further, a yaw rate estimating device 300 based on a sixth aspect (yaw rate estimating device 340 according to the second modification) is the yaw rate estimating device 300 based on any one of the first to fifth aspects that may employ a configuration in which the information acquirer 311 further acquires information on the yaw rate of the own vehicle 1 detected by a yaw rate sensor, a fusion yaw rate generator (343, 345) is further included that generates a fusion yaw rate YRfs by adding a detected yaw rate YRsr, which is a value detected by the yaw rate sensor, and a lane yaw rate YRln, which is a value estimated by the lane yaw rate estimator 319, at a predetermined contribution ratio, and the generated fusion yaw rate YRfs is used as the yaw rate of the own vehicle 1.

According to the yaw rate estimating device 300 based on the sixth aspect (yaw rate estimating device 340 according to the second modification), the fusion yaw rate YRfs generated by adding the detected yaw rate YRsr and the lane yaw rate YRln at a predetermined contribution ratio is used as the yaw rate of the own vehicle 1, so that in addition to the operations and effects of the yaw rate estimating device 300 based on any one of the first to fifth aspects, it is possible to improve the estimation accuracy of the yaw rate that embodies the yaw behavior of the own vehicle 1 that fluctuates from moment to moment.

Further, a yaw rate estimating device 300 based on a seventh aspect (yaw rate estimating device 340 according to the second modification) is the yaw rate estimating device 300 based on the sixth aspect that may employ a configuration in which the information acquirer 311 further acquires information on a frequency of a signal relating to the detected yaw rate YRsr (detected YR frequency fsr) and a frequency of a signal relating to the lane yaw rate YRln (lane YR frequency f1$n$), and as shown in FIG. 9B, the fusion yaw rate generator (343, 345) increases the contribution ratio of the detected yaw rate YRsr with respect to the contribution ratio of the lane yaw rate YRln in a frequency band (high frequency band) where the frequency of the signal relating to the detected yaw rate YRsr (detected YR frequency fsr) exceeds a predetermined second frequency threshold f2, and increases the contribution ratio of the lane yaw rate YRln with respect to the contribution ratio of the detected yaw rate YRsr in a frequency band (low frequency band) where the frequency of the signal relating to the lane yaw rate YRln (lane YR frequency f1$n$) is less than a predetermined first frequency threshold f1.

Here, in the high frequency band where the frequency of the signal relating to the detected yaw rate YRsr (detected YR frequency fsr) exceeds the predetermined second frequency threshold f2, there is concern about the influence on the fusion yaw rate YRfs due to the lane yaw rate YRln in the high frequency band being inferior to the detected yaw rate YRsr in terms of immediate response (because the acquisition cycle of the lane yaw angle and lane curvature is relatively long).

On the other hand, in the low frequency band where the frequency of the signal relating to the lane yaw rate YRln (lane YR frequency f1$n$) is less than the predetermined first frequency threshold f1, there is concern about the influence on the fusion yaw rate YRfs caused by a yaw angle error due to the midpoint drift of the yaw rate sensor in the low frequency band.

Thus, the yaw rate estimating device 300 based on the seventh aspect (yaw rate estimating device 340 according to the second modification) employs the configuration in which the fusion yaw rate generator (343, 345) increases the contribution ratio of the detected yaw rate YRsr with respect to the contribution ratio of the lane yaw rate YRln in a frequency band (high frequency band) where the frequency of the signal relating to the detected yaw rate YRsr (detected YR frequency fsr) exceeds a predetermined second frequency threshold f2, and increases the contribution ratio of the lane yaw rate YRln with respect to the contribution ratio of the detected yaw rate YRsr in a frequency band (low frequency band) where the frequency of the signal relating to the lane yaw rate YRln (lane YR frequency f1$n$) is less than a predetermined first frequency threshold f1.

According to the yaw rate estimating device 300 based on the seventh aspect (yaw rate estimating device 340 according to the second modification), in addition to the operations and effects of the yaw rate estimating device 300 based on the sixth aspect, it is possible to suppress as much as possible the influence on the fusion yaw rate YRfs due to two the factors that a yaw angle error occurs due to the midpoint drift of the yaw rate sensor in the low frequency band (see FIG. 9B), and that the lane yaw rate YRln is inferior to the detected yaw rate YRsr in terms of immediate response in the high frequency band (see FIG. 9B).

As a result, the precision of the fusion yaw rate YRfs can be further improved.

Further, a yaw rate estimating device 300 based on an eighth aspect (yaw rate estimating device 360 according to the third modification) is the yaw rate estimating device 300 based on the seventh aspect that may employ a configuration which further includes a determinator 361 that determines whether or not a lane length LL relating to the traveling lane 93 recognized by the lane recognizer 313 is equal to or less than a predetermined lane length threshold (first lane length threshold LLth1, second lane length threshold LLth2), wherein when the recognized lane length LL relating to the traveling lane 93 is equal to or less than the lane length thresholds LLth1 and LLth2, the fusion yaw rate generator 363 reduces the contribution ratio of the lane yaw rate YRln as compared with a case where the recognized lane length LL relating to the traveling lane 93 exceeds the lane length thresholds LLth1 and LLth2.

According to the yaw rate estimating device 300 based on the eighth aspect (yaw rate estimating device 360 according to the third modification), the contribution ratio of the lane yaw rate YRln is reduced in the case where the lane length LL relating to the traveling lane 93 is relatively short, so that in addition to the operations and effects of the yaw rate estimating device 300 based on the seventh aspect, the influence on the fusion yaw rate YRfs caused by the decrease in the estimation precision of the lane yaw angle and the lane curvature is suppressed as much as possible.

As a result, the precision of the fusion yaw rate YRfs can be further improved.

Other Embodiments

The multiple embodiments described above present examples of embodying the present invention. Therefore, these should not limit the interpretation of the technical scope of the present invention. This is because the present invention can be carried out in various forms without departing from its gist or its main features.

For example, in the explanation of the yaw rate estimating device 300 according to the present invention, an embodiment is given as an example in which the image information of the front in the traveling direction, the left-right side, and the rear in the traveling direction of the own vehicle 1 is captured and acquired by the camera 11, but the present invention is not limited to this example. As the camera 11, at least any aspect may be employed as long as it is possible to capture and acquire image information in front of the own vehicle 1 in the traveling direction.

What is claimed is:

1. A vehicle control device comprising:
   a yaw rate estimating device that estimates a yaw rate of an own vehicle;
   an action plan generator that generates an action plan for the own vehicle based at least on the yaw rate of the own vehicle estimated by the yaw rate estimating device; and
   a travel controller that controls travel of the own vehicle by controlling a traveling driving force output device, a steering device, and a brake device to execute the action plan generated by the action plan generator,
   wherein the yaw estimating device comprises:
      an information acquirer that acquires information on a front image of the own vehicle and information on a vehicle speed;
      a lane recognizer that recognizes a traveling lane drawn on a traveling route of the own vehicle and a curvature of the traveling lane based on the information on the acquired front image of the own vehicle;
      a direction change rate calculator that calculates a change rate of a direction of the traveling lane on reference coordinates for the own vehicle based on the information on the recognized curvature of the traveling lane and the acquired vehicle speed;
      a yaw angle change rate calculator that calculates a change rate of a yaw angle of the own vehicle with respect to the direction of the traveling lane on reference coordinates for the own vehicle based on the information on the recognized curvature of the traveling lane and the acquired vehicle speed; and
      a lane yaw rate estimator that estimates a lane yaw rate, which is a yaw rate derived from the information on the curvature of the traveling lane and the vehicle speed of the own vehicle, based on the change rate of the direction of the traveling lane calculated by the direction change rate calculator and the change rate of the yaw angle of the own vehicle with respect to the direction of the traveling lane calculated by the yaw angle change rate calculator,
   wherein
   the estimated lane yaw rate is used as the yaw rate of the own vehicle,
   the lane recognizer recognizes the traveling lane and the curvature of the traveling lane by associating an approximate curve composed of an $n^{th}$-order (where n is an integer of 2 or more) polynomial as a trajectory of the traveling lane drawn on the traveling route of the own vehicle,
   the direction change rate calculator obtains the curvature of the traveling lane based on a second-order coefficient of the $n^{th}$-order polynomial, and
   the yaw angle change rate calculator obtains the yaw angle of the own vehicle with respect to the direction of the traveling lane based on a first-order coefficient of the $n^{th}$-order polynomial.

2. The vehicle control device according to claim 1 wherein
   the lane recognizer obtains the $n^{th}$-order polynomial based on continuous time series values of (n+1) or more including a value in question relating to the trajectory of the traveling lane, and
   the yaw angle change rate calculator calculates the change rate of the yaw angle of the own vehicle based on the first-order coefficient of the obtained $n^{th}$-order polynomial.

3. The vehicle control device according to claim 2, wherein the yaw rate estimating device further comprises:
   a low-pass filter that extracts a low frequency component relating to a time-series signal of the change rate of the yaw angle of the own vehicle calculated by the yaw angle change rate calculator.

4. A vehicle control device comprising:
   a yaw rate estimating device that estimates a yaw rate of an own vehicle;
   an action plan generator that generates an action plan for the own vehicle based at least on the yaw rate of the own vehicle estimated by the yaw rate estimating device; and
   a travel controller that controls travel of the own vehicle by controlling a traveling driving force output device, a steering device, and a brake device to execute the action plan generated by the action plan generator,
   wherein the yaw estimating device comprises:
      an information acquirer that acquires information on a front image of an own vehicle and information on a vehicle speed;
      a lane recognizer that recognizes a traveling lane drawn on a traveling route of the own vehicle and a curvature of the traveling lane based on the information on the acquired front image of the own vehicle;
      a direction change rate calculator that calculates a change rate of a direction of the traveling lane on reference coordinates for the own vehicle based on the information on the recognized curvature of the traveling lane and the acquired vehicle speed;
      a yaw angle change rate calculator that calculates a change rate of a yaw angle of the own vehicle with respect to the direction of the traveling lane on the reference coordinates for the own vehicle based on the information on the recognized curvature of the traveling lane and the acquired vehicle speed;
      a lane yaw rate estimator that estimates a lane yaw rate, which is a yaw rate derived from the information on the curvature of the traveling lane and the vehicle speed of the own vehicle, based on the change rate of the direction of the traveling lane calculated by the direction change rate calculator and the change rate of the yaw angle of the own vehicle with respect to the direction of the traveling lane calculated by the yaw angle change rate calculator; and a dead zone processor that performs dead zone processing on a signal relating to the curvature of the traveling lane recognized by the lane recognizer, wherein the estimated lane yaw rate is used as the yaw rate of the own vehicle, and the direction change rate calculator calculates the change rate of the direction of the traveling lane on the reference coordinates for the own vehicle based on the information on the curvature of the traveling lane after the dead zone processing and the acquired vehicle speed.

5. A vehicle control device comprising:

a yaw rate estimating device that estimates a yaw rate of an own vehicle;

an action plan generator that generates an action plan for the own vehicle based at least on the yaw rate of the own vehicle estimated by the yaw rate estimating device; and a travel controller that controls travel of the own vehicle by controlling a traveling driving force output device, a steering device, and a brake device to execute the action plan generated by the action plan generator, wherein the yaw estimating device comprises:

an information acquirer that acquires information on a front image of an own vehicle and information on a vehicle speed;

a lane recognizer that recognizes a traveling lane drawn on a traveling route of the own vehicle and a curvature of the traveling lane based on the information on the acquired front image of the own vehicle;

a direction change rate calculator that calculates a change rate of a direction of the traveling lane on reference coordinates for the own vehicle based on the information on the recognized curvature of the traveling lane and the acquired vehicle speed;

a yaw angle change rate calculator that calculates a change rate of a yaw angle of the own vehicle with respect to the direction of the traveling lane on the reference coordinates for the own vehicle based on the information on the recognized curvature of the traveling lane and the acquired vehicle speed;

a lane yaw rate estimator that estimates a lane yaw rate, which is a yaw rate derived from the information on the curvature of the traveling lane and the vehicle speed of the own vehicle, based on the change rate of the direction of the traveling lane calculated by the direction change rate calculator and the change rate of the yaw angle of the own vehicle with respect to the direction of the traveling lane calculated by the yaw angle change rate calculator; and a yaw rate sensor that detects a yaw rate of the own vehicle, wherein the information acquirer further acquires information on the yaw rate of the own vehicle detected by the yaw rate sensor, a fusion yaw rate generator is further included that generates a fusion yaw rate by adding a detected yaw rate, which is a value detected by the yaw rate sensor, and a lane yaw rate, which is a value estimated by the lane yaw rate estimator, at a predetermined contribution ratio, and the generated fusion yaw rate is used as the yaw rate of the own vehicle.

6. The vehicle control device according to claim 5, wherein the information acquirer further acquires information on a frequency of a signal relating to the detected yaw rate and a frequency of a signal relating to the lane yaw rate, and the fusion yaw rate generator increases a contribution of the detected yaw rate with respect to a contribution of the lane yaw rate to the contribution ratio in a frequency band where the frequency of the signal relating to the detected yaw rate exceeds a predetermined second frequency threshold, and increases the contribution of the lane yaw rate with respect to the contribution of the detected yaw rate to the contribution ratio in a frequency band where the frequency of the signal relating to the lane yaw rate is less than a predetermined first frequency threshold.

7. The vehicle control device according to claim 6, wherein the yaw rate estimating device further comprises:

a determinator that determines whether or not a lane length relating to the traveling lane recognized by the lane recognizer is equal to or less than a predetermined lane length threshold, wherein when the recognized lane length relating to the traveling lane is equal to or less than the lane length threshold, the fusion yaw rate generator reduces the contribution of the lane yaw rate to the contribution ratio as compared with a case where the recognized lane length relating to the traveling lane exceeds the lane length threshold.

* * * * *